US007031904B1

(12) United States Patent
Wilson et al.

(10) Patent No.: US 7,031,904 B1
(45) Date of Patent: Apr. 18, 2006

(54) METHODS FOR IMPLEMENTING AN ETHERNET STORAGE PROTOCOL IN COMPUTER NETWORKS

(75) Inventors: Andrew W. Wilson, Fremont, CA (US); Paul J. von Stamwitz, Mountain View, CA (US); Laurence B. Boucher, Saratoga, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/490,630

(22) Filed: Jan. 24, 2000

Related U.S. Application Data

(60) Provisional application No. 60/117,226, filed on Jan. 26, 1999, provisional application No. 60/163,266, filed on Nov. 3, 1999.

(51) Int. Cl.
*G06F 15/16* (2006.01)
(52) U.S. Cl. .............. 703/230; 703/232; 703/236; 703/250; 370/338; 370/474
(58) Field of Classification Search ............... 709/230, 709/250, 232, 236, 224; 370/338, 474, 395.52
See application file for complete search history.

(56) References Cited

U.S. PATENT DOCUMENTS

| 5,535,375 | A |   | 7/1996  | Eshel et al. ............... 391/500 |
|-----------|---|---|---------|--------------------------------------|
| 5,617,424 | A | * | 4/1997  | Murayama et al. ......... 370/389 |
| 5,696,899 | A |   | 12/1997 | Kalwitz ....................... 395/200 |
| 5,903,724 | A | * | 5/1999  | Takamoto et al. .......... 709/200 |
| 5,909,564 | A | * | 6/1999  | Alexandria et al. ......... 395/311 |
| 5,918,022 | A | * | 6/1999  | Batz et al. .................. 709/236 |
| 5,938,752 | A |   | 8/1999  | Leung et al. ............... 710/126 |
| 5,966,510 | A |   | 10/1999 | Carbonneau et al. ..... 395/183.2 |
| 5,996,024 | A |   | 11/1999 | Blumenau ................... 709/301 |
| 5,999,541 | A |   | 12/1999 | Hinchey et al. ............ 370/466 |
| 6,006,268 | A |   | 12/1999 | Coile et al. ................. 709/227 |
| 6,018,530 | A |   | 1/2000  | Chakravorty ............... 370/471 |
| 6,084,892 | A | * | 7/2000  | Benash et al. .............. 370/401 |
| 6,105,092 | A |   | 8/2000  | Oeda et al. ................. 710/104 |
| 6,167,515 | A |   | 12/2000 | Lin ............................ 713/160 |
| 6,172,990 | B1| * | 1/2001  | Deb et al. ................... 370/474 |

(Continued)

OTHER PUBLICATIONS

Alessandro Braccini., Interprocess Communication Dependency on Network Load, vol. 17, Issue 1991 (IEEE Transaction son Software Engineering, 1991. pp. 257-369.*

(Continued)

*Primary Examiner*—David Wiley
*Assistant Examiner*—Thanh T Nguyen
(74) *Attorney, Agent, or Firm*—Martine Penillia & Gencarella, LLP

(57) ABSTRACT

A method for processing storage data that is to be communicated over a network is provided. Initially, storage data to be transmitted over a network is provided. Once the data is provided, the method includes serializing the storage data using storage encapsulation protocol headers to generate serialized storage data. Then, the serialized storage data is encapsulated using a simple transport protocol to generate simple transport protocol data segments of the storage data. At this point, each of the simple transport protocol data segments are encapsulated into Ethernet frames. The Ethernet frames can then be communicated over standard Ethernet hubs and switches to enable communication to a selected storage target. In one example, the storage data is provided in the form of SCSI data, ATAPI data, and the like. This data can then be communicated to any storage target that may be connected to the network that is capable of processing the storage data.

20 Claims, 16 Drawing Sheets

U.S. PATENT DOCUMENTS

| | | |
|---|---|---|
| 6,181,699 B1 | 1/2001 | Crinion et al. ............... 370/392 |
| 6,185,203 B1 | 2/2001 | Berman ...................... 370/351 |
| 6,215,789 B1 * | 4/2001 | Keenan et al. ............... 370/399 |
| 6,226,680 B1 | 5/2001 | Boucher et al. ............. 709/230 |
| 6,246,683 B1 | 6/2001 | Connery et al. ............. 370/392 |
| 6,247,101 B1 | 6/2001 | Settles ........................ 711/145 |
| 6,272,129 B1 * | 8/2001 | Dynarski et al. ............ 370/356 |
| 6,289,023 B1 | 9/2001 | Dowling et al. ............. 370/419 |
| 6,289,388 B1 * | 9/2001 | Disney et al. ............... 709/238 |
| 6,333,931 B1 * | 12/2001 | LaPier et al. ................ 370/385 |
| 6,336,171 B1 | 1/2002 | Coskrey, IV ................ 711/152 |
| 6,421,730 B1 * | 7/2002 | Narad et al. ................. 709/236 |
| 6,430,623 B1 * | 8/2002 | Alkhatib ...................... 709/245 |
| 6,438,603 B1 * | 8/2002 | Ogus ........................... 709/233 |
| 6,452,915 B1 * | 9/2002 | Jorgensen ................... 370/338 |
| 6,453,360 B1 * | 9/2002 | Muller et al. ................ 709/250 |

OTHER PUBLICATIONS

Kastenholz, F. "Definitions of Managed Objects for the Ethernet-like Interface Type" RFC 1643, Jul. 1994.

Crawford, M. "Transmission of IPv6 Packets over Ethernet Networks" RFC 2464, Dec. 1998.

Plummer, David C. "An Ethernet Address Resolution Protocol" RFC 826, Nov. 1982.

* cited by examiner

Write Command and Data

| A | S | MO | C | DO | MI |
|---|---|---|---|---|---|
| sid | sid | id, tag | cdb | data | discon |

Write Status

| A | R | MI | ST | MI |
|---|---|---|---|---|
| sid | sid | id, tag | status | done |

Read Command

| A | S | MO | C | MI |
|---|---|---|---|---|
| sid | sid | id, tag | cdb | discon |

Read Data and Status

| A | R | MI | DI | ST | MI |
|---|---|---|---|---|---|
| sid | sid | id, tag | data | status | done |

Fig. 4A

| SCSI Phase | Information Transferred |
|---|---|
| A – Arbitration Phase<br>S – Selection Phase<br>C – Command Phase<br>MI – Message In Phase<br>MO – Message Out Phase<br>DI – Data In Phase<br>DO – Data Out Phase<br>ST – Status Phase | sid – SCSI ID<br>cdb – Command Data Block<br>data – Read or Write Data<br>status – Status<br>id – Identify Message<br>tag – TAG Message<br>discon – Disconnect Message<br>done – Command Done Message |

Fig. 4B

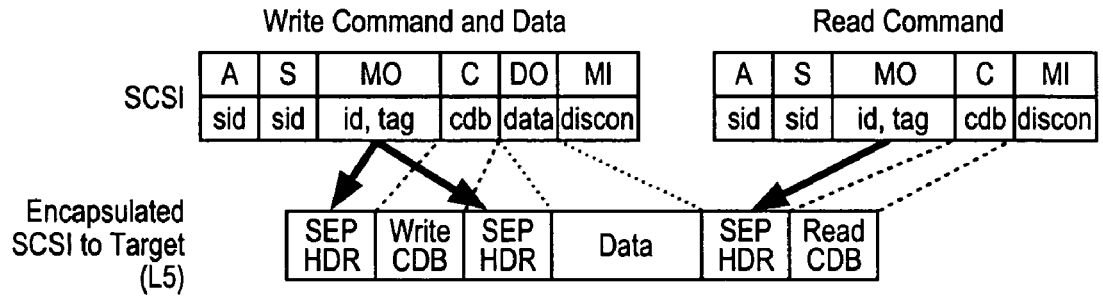

Fig. 4C

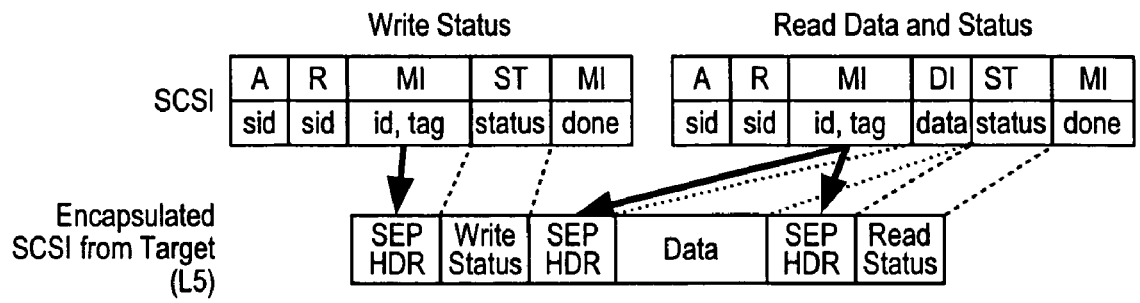

METHODS FOR IMPLEMENTING AN ETHERNET STORAGE PROTOCOL IN COMPUTER NETWORKS

CROSS REFERENCE TO RELATED APPLICATIONS

This application claims priority from: (1) U.S. Provisional Patent Application No. 60/117,226, filed Jan. 26, 1999, and entitled "SCSI OVER ETHERNET," and (2) U.S. Provisional Patent Application No. 60/163,266, filed Nov. 3, 1999, and entitled "SCSI OVER ETHERNET." Each of these provisional applications are herein incorporated by reference. This application is also related to U.S. patent application having application Ser. No. 09/490,629, filed on the same day as the instant application, and entitled "ETHERNET STORAGE PROTOCOL NETWORKS." This application is hereby incorporated by reference.

BACKGROUND OF THE INVENTION

1. Field of the Invention

This invention relates generally to communication protocols, and more particularly to lightweight communication protocols for efficiently communicating data between networked computers.

2. Description of the Related Art

The art of networking computers has evolved over the years to bring computer users a rich communication and data sharing experience. As is well known, the Internet has given rise to a new level of sophisticated communication technologies that enable users to share information and communicate via electronic mail with users all over the world. Most of the worlds computers communicate using a well established communication protocol referred to as TCP/IP. TCP/IP is a set of protocols developed to allow cooperating computers to share resources across a network. TCP (the "transmission control protocol") is responsible for breaking up a message into variable length segments, reassembling them at the other end, resending anything that gets lost, and putting things back in the right order. IP (the "internet protocol") is responsible for routing individual segments.

As originally designed, the TCP protocol was intended to be a very fault tolerant protocol that could withstand catastrophic failures of the communication network. TCP was also designed with long range communication and messaging in mind. As a result, TCP is inherently a protocol that has high overhead for handling the communication of variable length segments.

As a high level overview, take an exemplary data file that is selected for communication over a network using the TCP protocol. Initially, the TCP protocol will break up the data file into a plurality of variable length segments. Each variable length segment is then packaged with an associated TCP header. An IP header will also be added to the beginning of the packet. The packet data, header, and partial IP header are also processed through a checksum before transmission. The packets are now transmitted over the network, where each packet may potentially travel a different path (e.g., through a plurality of routers and the like) in their journey to a destination. At the destination, the TCP protocol is charged with receiving the packets. However, the packets do not necessarily arrive at the destination in order.

Consequently, the TCP protocol is charged with managing the reordering of the received packets. The managing requires the TCP protocol to keep track of timing parameters and other variables to ascertain whether or not certain packets were lost during transmission. For example, the TCP protocol must calculate round trip times defined by when a packet is sent out and when an acknowledgement (ACK) is received. This timing must be continually monitored using complex timing algorithms and adjusted when necessary. If after a set amount of time no ACK is received, it is assumed that the packet is lost and thus must be resent.

As an example, assume that a sender begins to send packets to a given target. The sender will operate on a timer to determine when certain packets are not received. In some cases, a packet is received, however, the target took too long to acknowledge safe receipt. This situation tends to happen most often as congestion over a network path increases. To handle such situations, TCP utilizes what is referred to as a "slow start algorithm." The slow start algorithm is triggered when congestion reaches a point where packets are not being acknowledged (i.e., when the sender times out) and therefore the sending operation is restarted. The restarting therefore causes significant reductions in throughput performance. More importantly, because the sender is primarily relying on the time out to determine when packets are lost, the slow start algorithm will many times cause a restart when a packet is not necessarily lost. That is, the acknowledgment may just have taken slightly longer than the fixed time out. Consequently, if the acknowledgment was received just after the time out, the slow start algorithm will still cause a resend.

Although this type of processing works, the processing performed for lost packet detection can be computationally intensive. In order to handle the processing of the TCP protocol, the TCP protocol is commonly implemented in software. The handling in software is primarily necessitated to enable, among other things, the detection of lost packets, and the reordering of received packets.

To appreciate the amount of overhead needed to transmit data using standard TCP/IP, the following describes the sending and receiving of data with a SCSI host adapter and a typical NIC. When sending data, the host adapter driver is given a pointer to a buffer of data, which the driver converts to a scatter/gather list of physical memory segments and are passed to the host adapter. From there on, the adapter takes over and transfers all the data without further CPU intervention, posting an interrupt when it is finished with the whole buffer. The TCP/IP stack gets a similar pointer to a buffer, but has to generate headers for encapsulation. Part of that process involves reading every byte to form the TCP checksum. The user buffer is logically broken into 1500 byte (or so) chunks and passed to the driver, one chunk at a time. A good implementation doesn't actually have to copy anything, it just sends a set of scatter gather pointers to the driver, one for the chunk of data to be sent in a packet, and a couple for the TCP and IP headers. These are converted to physical addresses by the driver, and sent to the NIC, which then transmits the data packet and then requests the next one (either through an interrupt or by pulling the information off of a linked list). The bottom line for a typical 4K data buffer is that a (SCSI command block) SCB and one or two element S/G (scatter/gather) list is passed to the host adapter, while three separate packets, with a total of at least 9 S/G pointers are passed to the NIC, plus every byte of the data and headers has to be read to form the IP checksum.

It is even worse on the receive side, because it is unknown as to which user buffer to place the received data into until the headers are inspected. While some recent NIC chips can separate the TCP/IP header from the rest of the data packet and give the host a few microseconds to tell it where to put the rest of the packet, allowing direct DMA to the user buffer, most implementations put the received data in a driver buffer, then copy the user data to the user's buffer after inspecting the header. As with sending, a pass over the data and headers is also needed to verify the TCP checksum.

In view of the foregoing, there is a need for a networking protocol that removes the overhead issues produced by conventional TCP. There is also a need for a transport protocol that is optimized for storage and enables fast and efficient utilization in local area networks, wide area networks, and over the Internet.

SUMMARY OF THE INVENTION

Broadly speaking, the present invention fills these needs by providing an Ethernet storage protocol (ESP) that streamlines the processing and communication of storage data and removes the overhead associated with prior art communication protocol techniques. Preferably, the ESP is configured to efficiently encapsulate the data with an efficient lightweight transport protocol, and is configured to provide unlimited scaleablity to storage resources. In one preferred embodiment, the ESP is configured to encapsulate SCSI data and communicate the SCSI data over an Ethernet network. The communication is preferably accomplished by enabling host computers and target peripheral devices (e.g., storage drives) to operate using the ESP. It should be appreciated that the present invention can be implemented in numerous ways, including as a process, an apparatus, a system, a device, a method, or a computer readable medium. Several inventive embodiments of the present invention are described below.

In one embodiment, a method for processing storage data that is to be communicated over a network is disclosed. Initially, storage data to be transmitted over a network is provided. Once the data is provided, the method includes serializing the storage data using storage encapsulation protocol headers to generated serialized storage data. Then, the serialized storage data is encapsulated using a simple transport protocol to generate simple transport protocol data segments of the storage data. At this point, each of the simple transport protocol data segments are encapsulated into Ethernet frames. The Ethernet frames can then be communicated over standard Ethernet hubs and switches to enable communication to a selected storage target.

In another embodiment, an Ethernet storage protocol (ESP) enabled network is disclosed. The ESP network includes a host computer having host interface circuitry for communicating data in an Ethernet network. The host interface circuitry is configured to receive parallel data from the host computer provided in accordance with a peripheral device protocol (e.g., SCSI). The parallel data is serialized and encapsulated into Ethernet frames for transmission over the Ethernet network. The ESP network also includes a target having target interface circuitry for communicating data in the Ethernet network. The target interface circuitry is configured to receive the encapsulated serialized parallel data and reconstruct the serialized parallel data into the peripheral device protocol. In this embodiment, the peripheral device protocol is one of a SCSI protocol, an ATAPI protocol, and a UDMA protocol. In addition, the serializing in this embodiment includes attaching storage encapsulation protocol (SEP) headers to portions of the parallel data and attaching simple transport protocol (STP) headers to one or more portions of the parallel data having the SEP headers, such that each STP header defines an STP packet. Thus, transmission over the Ethernet network does not require the TCP protocol, which is large on overhead and inefficient for storage data transfers in a local area network environment.

In yet a further embodiment, a method for communicating storage data over an Ethernet network using a non-TCP lightweight transport protocol is disclosed. The method includes providing data having a peripheral device protocol format, and the data is configured to be communicated over the Ethernet network. The method then proceeds to select portions of the data and attach storage encapsulation (SEP) headers to the selected portions of the data. The method now attaches simple transport protocol (STP) headers to one or more of the selected portions having the SEP headers to produce STP packets. Once the STP packets are defined, the method moves to encapsulate the STP packets into Ethernet frames for communication over the Ethernet network. In this embodiment, the peripheral device protocol format is one of a SCSI format, an ATAPI format, and a UDMA format. Further, each of the STP headers are configured to include at least a handle field, a type field, a length field, a sequence number field, and an acknowledgment field.

In still a further embodiment, a network for efficiently communicating storage data is disclosed. The network includes a cluster server system having a plurality of host server systems, and each of the host server systems have a peripheral interface card for facilitating storage data communication in accordance with an Ethernet Storage protocol (ESP). A storage box is also included having one or more storage peripheral devices. The storage box includes a bridge circuit for facilitating storage data communication in accordance with the ESP. The network is interconnected by way of an Ethernet switch which is configured to connect the cluster server system to the storage box. In this embodiment, the ESP is configured to: (i) select portions of the storage data; (ii) attach storage encapsulation protocol (SEP) headers to the selected portions of the storage data; (iii) attach simple transport protocol (STP) headers to one or more of the selected portions having the SEP headers to produce STP packets; and (iv) encapsulate the STP packets into Ethernet frames for communication over the Ethernet network including the cluster server system, the storage box, and the Ethernet switch. An added advantage of this embodiment is the ability of the ESP to add an IP header after the STP header for communication over an ISO level 3 router or level 3 switch.

In yet a further embodiment, a storage area network (SAN) is disclosed. The SAN includes a server system including one or more host computer systems. Each host computer system includes network interface circuitry and host peripheral interface circuitry. The network interface circuitry is configured to communicate data using a TCP protocol and the host peripheral interface circuitry is configured to communicate data using an Ethernet storage protocol (ESP). A storage box is also provided having one or more storage drives, and the storage box has a bridge circuit for communicating data using the ESP. The network also includes an Ethernet switch for communicating the server system to the storage box. The ESP is configured to: (i) select portions of the data; (ii) attach storage encapsulation protocol (SEP) headers to the selected portions of the data; (iii) attach simple transport protocol (STP) headers to one or more of the selected portions having the SEP headers to produce STP packets; and (iv) encapsulate the STP packets into Ethernet frames for communication over the network including the Ethernet switch. In this network environment, one or more desk top computers may be connected to the network interface circuitry of the server system. The desk top computers have standard network interface cards (NICs) for communicating standard Ethernet frames to and from the server system. The ESP is configured to add an IP header after the STP header of the STP packets for communication over one of a level 3 router and a level 3 switch. In this embodiment, each of the one or more host computer systems can be servers that are not necessarily homogeneous (i.e., each can operate using different operating systems like Windows™ NT, Windows™ 2000, UNIX, Linux, Sun Microsystems Inc. Solaris, etc.). Further, each host computer system can be a cluster if desired. Of course, the cluster will include two or more homogeneous computer systems (i.e., running the same operating system).

The advantages of the present invention are many and substantial. Most notably, the Ethernet storage protocol (ESP) of the present invention simplifies the communication elements needed to transfer data over a network and enables nearly unlimited scaleablity. The ESP preferably implements a simple transport protocol (STP) that requires less CPU processing than conventional TCP. It is estimated that CPU utilization for networks using ESP may be as small as 1/5 of networks using TCP. In a more preferred embodiment, the ESP will be implemented primarily using hardware and simple software drivers in order to further limit CPU requirements. The ESP also preferably takes advantage of a storage encapsulation protocol (SEP) which is configured to encapsulate portions of storage data, such as SCSI data, ATAPI data, UDMA data, etc. In communication, senders and targets establish communication sessions by exchanging handles, which are used to identify the senders and targets in subsequent communication transactions. Once a session is open, the session preferably will remain open for the entire time the target and host are connected to the ESP network. Another advantage of the present invention is that Ethernet frames are counted to determine whether packets have successfully been transferred. This is substantially more efficient than prior art techniques utilizing TCP, which rely on byte counting and complicated time-out calculations.

The ESP of the present invention opens up the ability to share large pools of storage utilizing standard Ethernet equipment. The ESP network preferably includes host computers having peripheral interface cards (PICs) and storage targets, each capable of operating the ESP. In one embodiment, the targets can be native ESP devices having circuitry for operating the ESP operations. In other embodiments, off-the-shelf storage drives can be used in conjunction with a bridge circuit that can run the ESP.

Finally, it will become apparent to those skilled in the art that the ESP of the present invention can have applicability in desk top and server applications, cluster server systems, storage area networks, and other storage networking applications. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 4A illustrates a typical pair of SCSI transactions.

FIG. 4B defines a table that illustrates the SCSI phase definitions as well as the information transferred definitions used in FIG. 4A.

FIG. 4C illustrates an encapsulation technique for parallel SCSI phases for use on serial protocols, in accordance with one embodiment of the present invention.

FIG. 4D shows how the SCSI status and read data are encapsulated as a stream of bytes heading back to the sender from the target, in accordance with one embodiment of the present invention.

FIGS. 5B-1, 5B-2, and 5B-3 illustrate exemplary lookup tables used to keep track of open sessions and to identify handles exchanged by initiators and targets, in accordance with one embodiment of the present invention.

DETAILED DESCRIPTION OF THE PREFERRED EMBODIMENTS

Figure 1A:
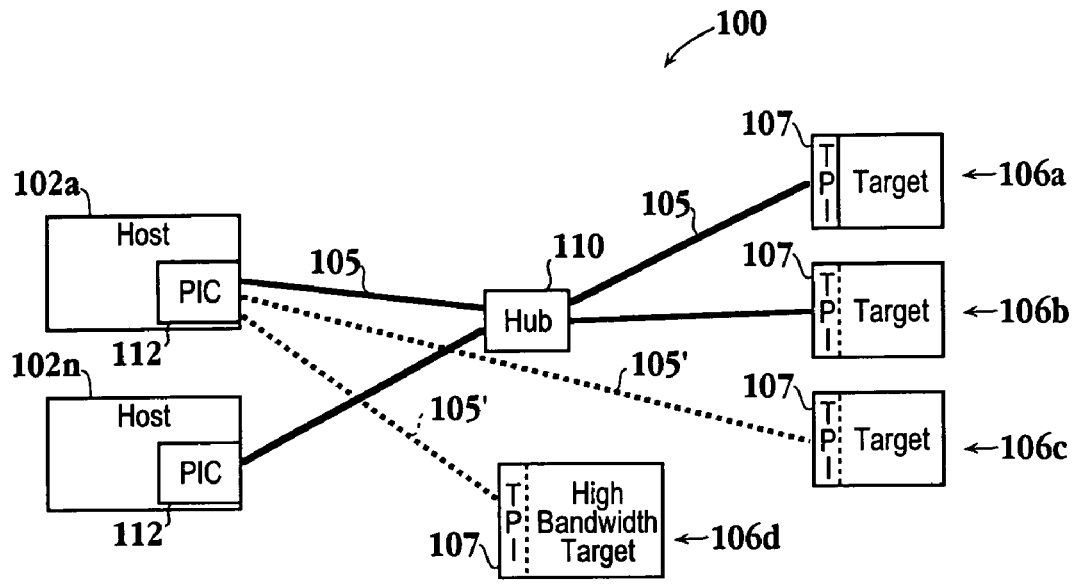
FIG. 1A shows a computer network topology 100 implementing the Ethernet storage protocol (ESP) to efficiently transport storage data in a desk top environment of a high speed network, in accordance with one embodiment of the present invention.

An invention is described for a system for efficient data transfers in a network environment. Preferably, the network environment will be modified to work in accordance with an Ethernet Storage Protocol (ESP). An ESP network will preferably include host computers equipped with hardware to enable communication using a lightweight transport protocol, such as a simple transport protocol (STP) of the present invention. The STP is configured to eliminate the overhead and inefficiencies associated with prior art transport protocols, such as TCP. In one embodiment, the STP of the present invention will enable more efficient transfers of data over a communication link, such as a local area network (LAN). Communication can also occur over a larger network, such as the Internet with the additional implementation of the Internet Protocol (IP). Consequently, STP can either run on its own in a local environment or over IP. In a wide area network, it may also be beneficial to run STP over IP to enable communication over level 3 switches and/or routers.

The STP can be configured to transfer any type of data, however, the exemplary embodiments described herein illustrate the advantages of STP in relation to storage data transfers that need to be communicated over a network connection at fast speeds. Exemplary connection speeds are those defined by any of the Ethernet standards (e.g., 10Base T Ethernet, 100Base T Ethernet, Gigabit Ethernet, 10 Gigabit Ethernet, etc.). Other connection links can also include Fibre Channel.

In one embodiment, the transported data will be in the form of SCSI data, which is encapsulated for communication using a storage encapsulation protocol (SEP). In another embodiment, the transported data can be ATAPI data, UDMA data, or any other data that can benefit from the efficient network communication of the ESP of the present invention.

Another example of data can be data processed through interprocess communication (IPC) between multiple hosts. IPC involves sending information from one process to another. The term IPC covers a large range of operating system features. Any time a process needs to send information to another process some form of IPC is used. Several basic types include semaphores, signals, pipes, messages, ports, and pseudo-terminals. These IPC mechanisms cover almost every conceivable communication task a program could possibly need to do. A protocol to transfer the IPC messages can be virtual interface (VI). And thus, VI data can be transferred using the STP of ESP. For completeness, it should also be noted that network data can also be transferred by way of the STP of ESP.

Thus, the encapsulated data is subsequently encapsulated into Ethernet frames for fast efficient communication over a network to a desired target. The target, therefore, is preferably a storage target, such as a hard disk, a RAID array, a CD media device, a storage box, or other peripheral device that can store and exchange data.

In a network environment of ESP, a host computer will preferably include a peripheral interface card (PIC), and a target that is enabled for ESP communication will include a target peripheral interface (TPI). As will be described below, it is also possible to use storage devices that are not native ESP devices. In such a case, a bridge circuit having hardware for handling STP and SEP communication will be provided. The bridge will therefore enable, for example, the connection of standard off-the-shelf storage devices to the bridge circuit and to the ESP network.

It will be obvious, however, to one skilled in the art, that the present invention may be practiced without some or all of these specific details. In other instances, well known process operations have not been described in detail in order not to unnecessarily obscure the present invention.

FIG. 1A shows a computer network topology 100 implementing the Ethernet storage protocol (ESP) to efficiently transport storage data in a desk top environment of a high speed network, in accordance with one embodiment of the present invention. The ESP is configured to enable the transferring of data over a high speed network using hardware and software that takes advantage of fewer transport constraints and thus is able to reduce transport overhead. In this example, the computer network topology 100 includes host computers 102a through 102n. Each of the host computers 102 include a peripheral interface card (PIC) 112 to enable communication to and from a desired one of the targets 106a–106d. The peripheral interface cards 112 can be in form of a PCI host adapter card or can be integrated into a computer motherboard of respective computers 102. In either case, each PIC is configured to handle data transfers by properly encapsulating the data in accordance with the STP and SEP protocols of the present invention.

Each target 106 will include a target peripheral interface (TPI) 107 to enable proper communication with the peripheral interface cards (PIC) 112 of the computers 102. In this example, the targets 106 are considered to be native ESP targets since the TPI is integrated into the target. In one embodiment, if the target 106 were a SCSI target, the SCSI chip would be integrated with the TPI circuitry to convert the SCSI target into a native ESP target. Thus, the TPI 107 of each target will be configured to receive data encapsulated by the PICs of the computers 102. The TPIs 107 are also configured to transmit data back to the PICs 107 using the STP and SEP encapsulation techniques to enable efficient data transfer exchanges between computers of the network topology 100.

In one embodiment, each PIC 112 can be configured to be a single port PIC. The communication capacity of each PIC 112 can be extended beyond direct connections by implementing a hub 110. By way of the hub 110, each PIC 112 can then communicate to any other target 106 that may be connected to the ESP network. In the illustrated example of FIG. 1A, the host computer 102a includes a PIC 112 that can establish a point-to-point link 105 by way of the hub 110 with the target 106a. As is well known, further expansion to additional peripheral device targets can be established by implementing additional Ethernet hubs or switches. Accordingly, a single PIC 112 of a particular host 102 can connect to a nearly unlimited number of targets, provided that the bandwidth limits are not exceeded.

In an alternative embodiment, a multi-port PIC can be provided to allow connection to several targets without the use of an external hub. The dash lines 105' illustrate connections that are established without an external hub. In still another embodiment, the PIC 112 could function with independent ports to provide additional bandwidth. If independent ports are implemented, then well known port aggregation would be used to provide higher bandwidth to higher performing targets. FIG. 1A also shows how multiple hosts 102n could share peripherals when a hub 110 is employed.

Figure 1B:
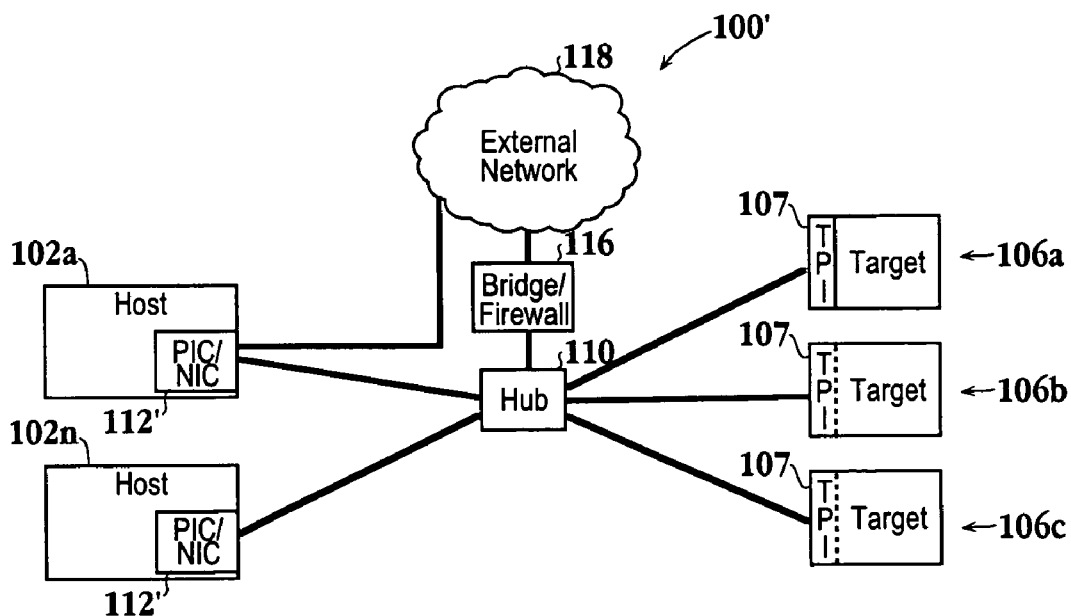
FIG. 1B illustrates another computer network topology, in accordance with one embodiment of the present invention.

FIG. 1B illustrates another computer network topology 100', in accordance with one embodiment of the present invention. In this embodiment, to make the network an ESP enabled network, each of the host computers 102a through 102n will include a peripheral interface card/network interface card (PIC/NIC) 112'. The PIC/NIC 112' will enable external network connections, such as to the Internet. In this embodiment, the NIC portion of the electronics may function as a standard network interface card which can implement TCP/IP. Accordingly, the PIC/NIC 112' preferably has a single port that can communicate both ESP data over the ESP network and TCP/IP data to and from an external network by way of the Hub 110, the bridge/firewall 116, and the external network 118. In another embodiment, the PIC/NIC 112' includes two or more independent ports such that one is dedicated to an external network connection and the others to connections to desired targets of the computer network topology 100'. Thus, if several computers were involved, and they shared both a network connection and several desk top peripherals (e.g., targets), then they are preferably connected through a single hub 110.

In still another embodiment, an optional bridge/firewall 116 may be provided to isolate the internal network from the external network. By using the bridge/firewall 116, TCP/IP traffic can be combined with ESP traffic on the same port. The bridge/firewall 116 in this embodiment, is preferably combined with the hub 110 and would provide level 2 bridging for traditional network traffic, and firewall services to prevent ESP traffic from crossing between the internal network and the external. Alternatively, even if the bridge/firewall 116 were not used, some TCP/IP traffic may still be placed on the ESP port to support peripheral configuration schemes, such as SNMP.

Figure 1C:
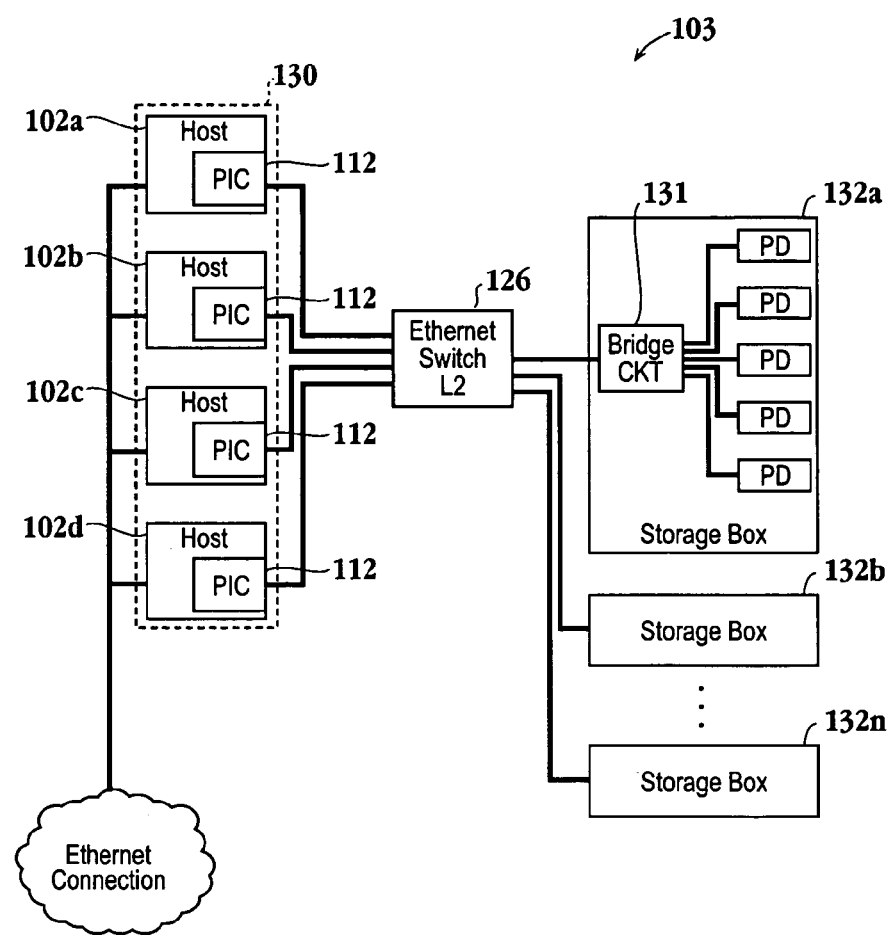
FIG. 1C illustrates yet another embodiment of the present invention, in which an ESP enabled network includes a cluster server system and storage boxes.

FIG. 1C illustrates yet another embodiment of the present invention, in which an ESP enabled network 103 includes a cluster server system 103 and storage boxes 132. The cluster server system 103 is shown, in this example, to include four host computers 102a–102d. Each of the host computers 102 will preferably include a PIC 112 to enable communication to the ESP network. Cluster server systems are well known, however, traditional cluster server systems are limited in their ability to communicate data over a network. Each of the storage boxes 132 can include a plurality of storage peripheral devices (PDs), such as hard disk drives, tape drives, CD media drives, and the like. Each storage box 132 may include a bridge circuit 131 that implements ESP.

In one example, if the PDs are SCSI hard drives that have parallel SCSI connections to the bridge circuit 131, the bridge circuit 131 that runs ESP can serialize the SCSI data to enable communication over the Ethernet network. Thus, when a storage box 132 is implemented, it is possible to use standard PDs, such as standard SCSI hard drives, standard ATAPI hard drives, UDMA drives and the like. That is, the bridge circuit 131 allows the use of non-ESP native target devices in the storage network. For example, if the storage devices are ATAPI devices, then the bridge circuit 131 will be configured to encapsulate the ATAPI commands and data. The same would be true for UDMA devices, and in most cases, the ATAPI and UDMA bridges would be the same.

In a preferred embodiment, the cluster server system 130 can be connected to a standard Ethernet network connection as well as to the ESP enabled network. The connection to the ESP enabled network can be established by way of an Ethernet switch 126 (e.g., a level 2 switch). It should be noted that the cluster server system 130 can, due to the scalability of the ESP, be connected to any number of storage boxes 132a–132n. As will be described below in greater detail, local data transfers in the ESP network only need to implement STP and SEP, which is a very lightweight transport protocol. In some cases, it may be desirable to connect one ESP network to another over a level 3 switch. In such a case, it is preferred that STP be run over IP.

Figure 1D:
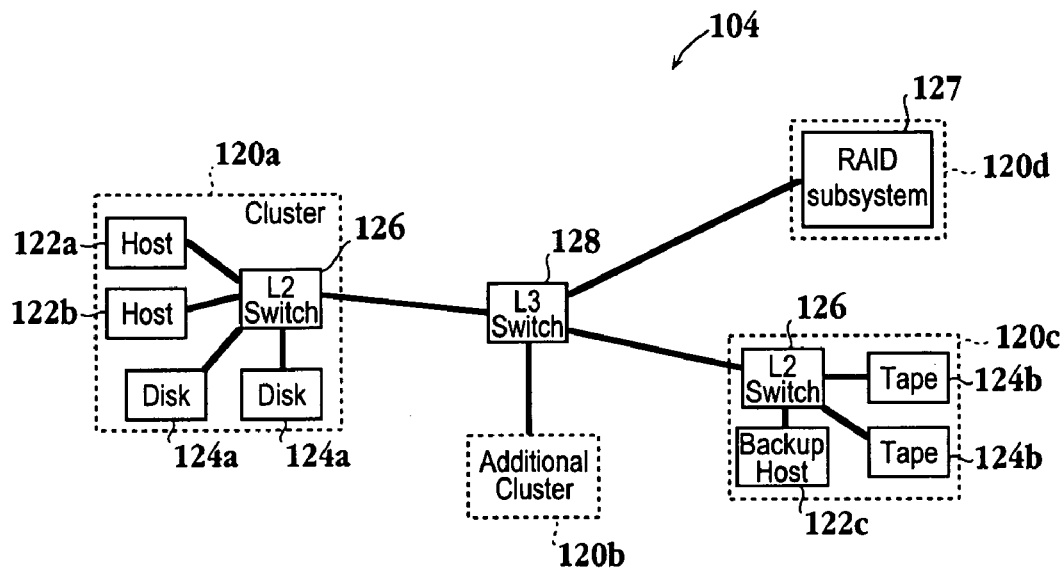
FIG. 1D shows another embodiment of the present invention, in which the ESP can be implemented.

FIG. 1D shows another embodiment of the present invention, in which the ESP can be implemented. In this example, the network 104 has a cluster 120a that includes hosts 122a, 122b and two native targets 124a. Each of the hosts 122a and 122b include a PIC 112, and all are connected to an level 2 (L2) switch 126. The cluster 120a can be connected to another distinct cluster 122c. The cluster 120c is shown including an L2 switch 126 and ESP native targets 124b (e.g., tape drives) and a backup host 122c. Preferably, the backup host 122c includes a PIC 112. Other clusters 120b as well as other devices, such as storage box 120d can be connected to a switch 128. The storage box 120d is, in this embodiment, a RAID subsystem. This network 104 is provided to illustrate that the simple transport protocol (STP) of the present invention can function very efficiently in a local ESP network. However, for communication between other remote clusters, STP can run over IP to enable efficient addressing. For communications within a LAN, STP can run without IP and by way of level 2 switches or hubs.

Figure 1E:
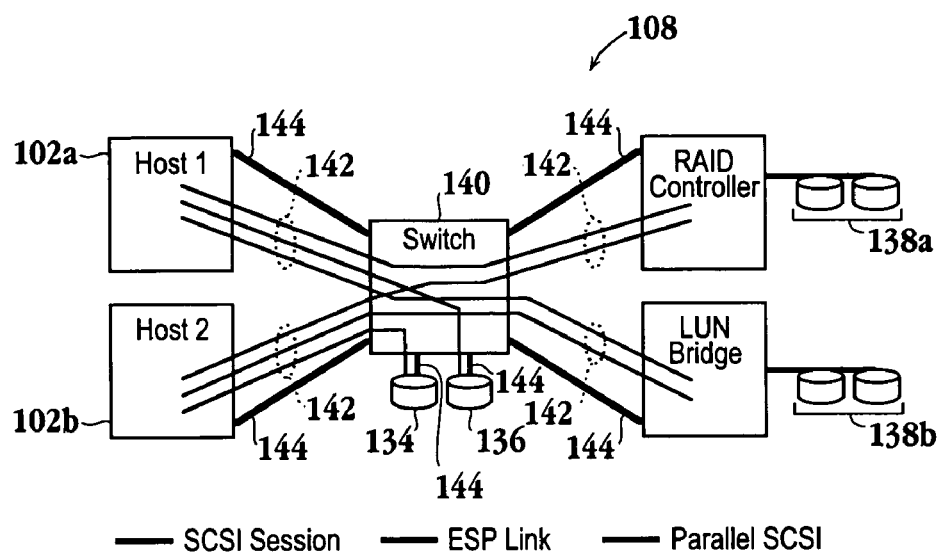
FIG. 1E shows network environment which runs the ESP, in accordance with another embodiment of the present invention.

FIG. 1E shows network environment 108 which runs the ESP, in accordance with another embodiment of the present invention. In this example, it is illustrated that communication sessions can be established between hosts and targets, and those sessions are established and remain open until terminated (even if no data is being transmitted between a sender and a target for a period of time). When the target devices are SCSI devices, SCSI sessions are established between particular hosts 102a and 102b and particular targets 134, 136, 138a and 138b. The targets 134 and 136 are preferably native ESP devices which connect directly to the switch 140. The targets 138a and 138b as shown having parallel SCSI connections, and those connections are converted into serial connections for communication over the Ethernet connection of the ESP network. For illustration purposes, the SCSI sessions are shown as lines 142 and the Ethernet cable lines 144 (e.g., CAT 5 wires) are shown connected to the ESP enabled devices (e.g., hosts, targets, storage boxes, etc.).

Figure 1F:
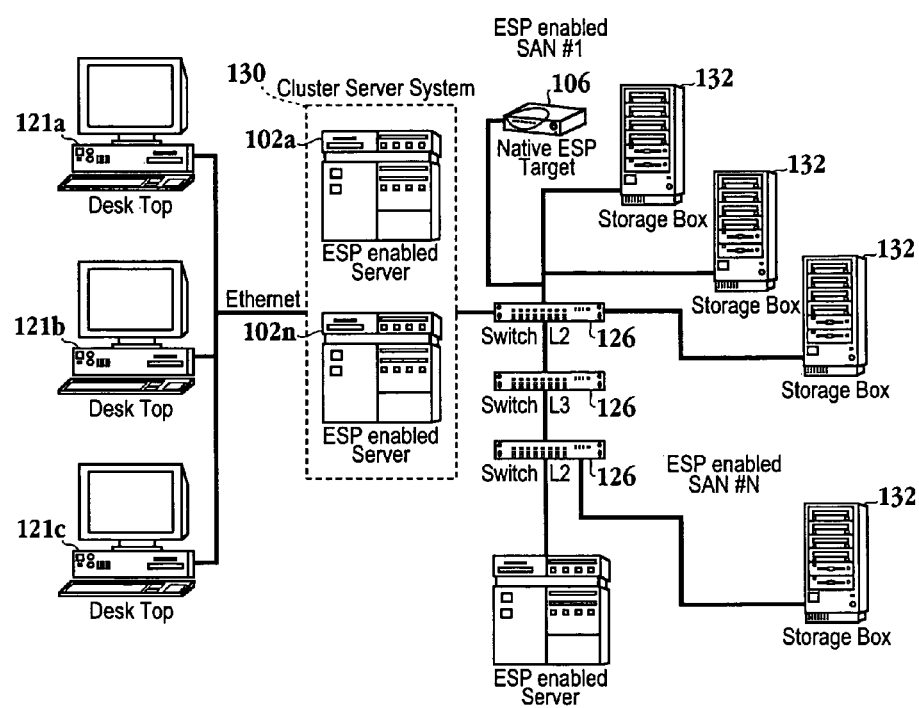
FIG. 1F illustrates another embodiment of the present invention, in which desk top computers are connected to a cluster server system using ESP.

FIG. 1F illustrates another embodiment of the present invention, in which desk top computers 121a–122c are connected to a cluster server system 130. As described above, a cluster sever system 130 will preferably include one or more server systems 102 for reliability, and each will include circuitry for enabling ESP connectivity to storage. In this example, users of the desk top computers 121 can gain access to the cluster server system 130 by way of a standard Ethernet connection. It will be assumed that each of the desk top computers 121 will have an appropriate network interface card (NIC) or have the NIC circuitry integrated into respective motherboards. Therefore, each of the server systems 102a–102n will preferably include a PIC and a NIC. Alternatively, the circuitry can be in the form of a PIC/NIC as described above with reference to FIG. 1B.

In either case, the cluster server system 130 will gain access to multiple storage area networks (SANs), which are preferably connected by way of a switch. In this illustration, a switch 126, which is preferably a standard level 2 Ethernet switch, is provided to connect the cluster server system 130 to storage boxes 132. As mentioned above, the storage boxes 132 can have multiple drives for storing data. The drives can be hard drives, optical disc drives, tape drives, RAID arrays, and the like. If standard off-the-shelf drives are used (e.g., SCSI hard drives), then a bride circuit 131 can be provided as part of the storage box 132 or can be provided as an external bridge circuit. This example also shows that native ESP targets 106 (e.g., such as hard drives, tape drives, optical drives) can be directly connected to the SAN #1. Thus, a SAN can be made of native target devices and non-native target devices using suitable bridge circuitry to implement the ESP operations.

Also shown is another SAN, identified as SAN #N to illustrate that an unlimited number of SANs can be connected over standard Ethernet switches. In this example, level 3 switch 128 is useful to provide a separation between SAN #1. When a level 3 switch or router is used to connect two networks, the ESP is preferably configured to add IP in front of STP to enable IP addressing.

Figure 1G:
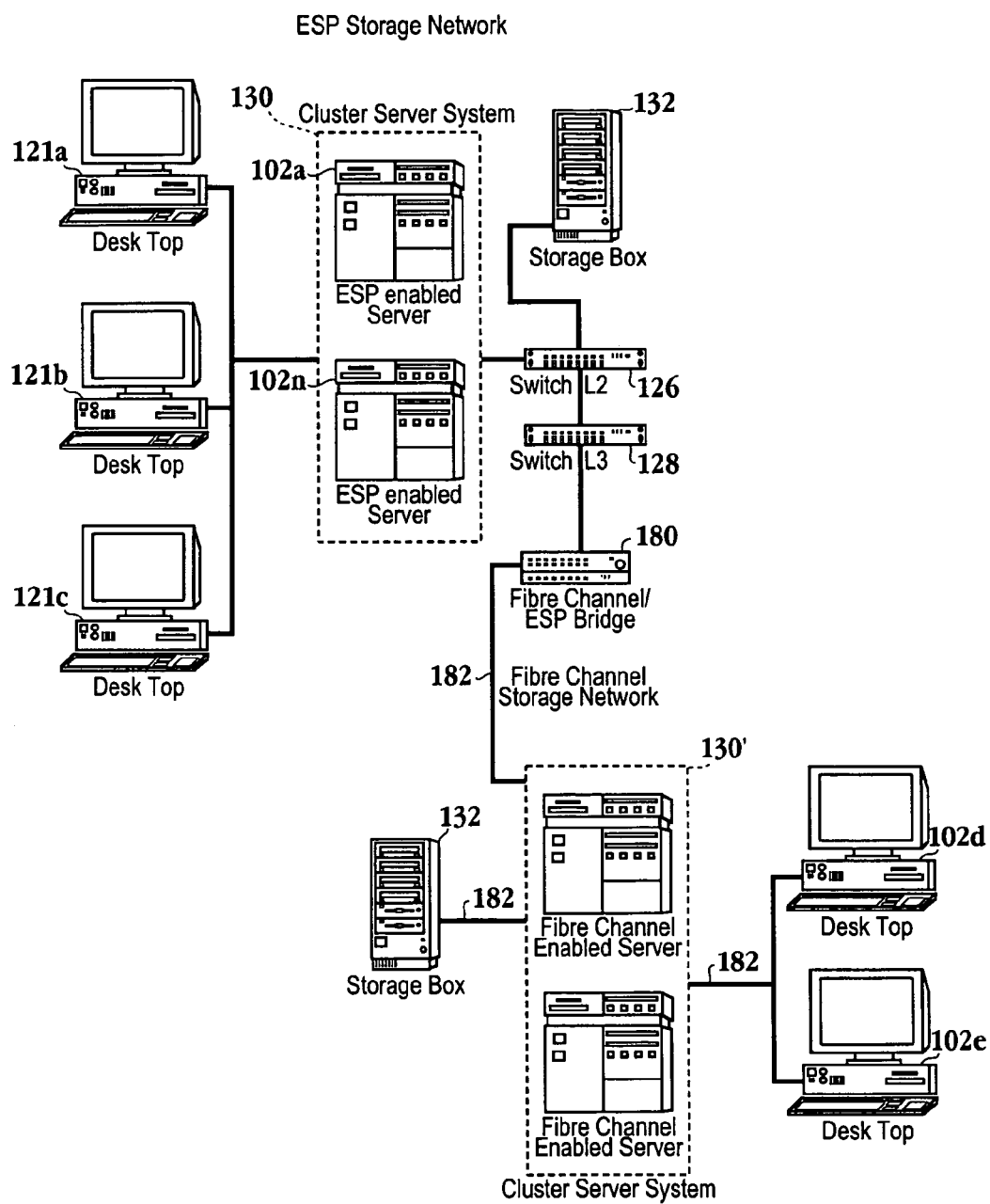
FIG. 1G illustrates another embodiment in which an ESP network can be connected to a Fibre Channel storage network.

FIG. 1G illustrates yet another embodiment of the present invention. In this embodiment, it is illustrated how an ESP enabled network can be linked to a Fibre Channel storage network. As discussed earlier, a number of desk top computers 121a–121c can be connected to a cluster server system 130 (or simply a single server). The cluster server system 130 preferably has computers that are ESP enabled. Communication from the desk top computers 121a–121c is preferably over a standard Ethernet connection. The cluster server system 130 is in turn connected to a level 2 Ethernet switch 126. The level 2 Ethernet Switch 126 can then be connected to a level 3 Ethernet Switch when IP encapsulates STP. In some environments, it may be desirable to connect the ESP storage network to a Fibre Channel storage network.

As is well known, Fibre Channel uses Fibre Channel Protocol (FCP) to transmit SCSI data. Traditionally, in order to communicate SNMP commands, Fibre Channel networks also use Ethernet cabling to communicate the configuration commands. As shown, the Fibre Channel storage network uses cables 182 to inter connect the network. The cables 182 include Fibre Channel cabling as well as Ethernet cabling. Thus, the SCSI data can be communicated using Fibre Channel and commands can be communicated using Ethernet. In yet another embodiment, Fibre Channel FCP can use IP to communicate control over the same Fibre Channel media. In either case, the Fibre Channel storage network can be connected to the ESP storage network by way of a Fibre Channel/ESP bridge 180. The bridge 180 can therefore translate between STP used in the ESP storage network and FCP used in the Fibre Channel network. In this example, the Fibre Channel storage network includes a cluster server system 130' that has Fibre Channel enabled servers and desk top computers 102d–102e that can communicate in the Fibre Channel environment.

Figure 1H:
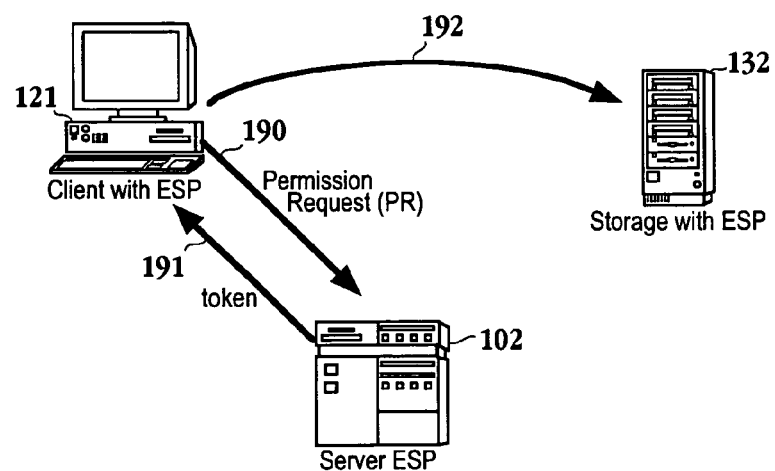
FIG. 1H illustrates yet another embodiment in which a client, a server, and a storage box are all ESP enabled, and the client can obtain a token from a server and then establish a direct link to the storage box over an Ethernet network.

FIG. 1H illustrates yet another embodiment in which a client, a server, and a storage box are all ESP enabled. In this embodiment, a client 121, which is connected to an Ethernet network and is ESP enabled can communicate with any server or storage box connected to the network. In this example, the user of the client 121 may want high bandwidth access to data stored on the storage box 132. The fastest connection between the client 121 and the storage box 132 is preferably by way of a direct link 192 instead of by way of the server. However, to maintain security over the data stored on the storage box 132, a client would first send a permission request (PR) 190 to the server 102. Once the PR is processed, the server 102 will send back a token by way of link 191 to the client 121. The token can then be used by the client 121 to directly access the storage box 132. This manner, a high speed Ethernet connection can be made between the client 121 and the storage box 132.

Example data that will benefit from this high speed connection between a client and the storage source (e.g., storage box 132) may be storage data, file data, web data, etc. Specific examples of speed sensitive data may be video data, pictures, text with video, and the like.

Figure 2A:
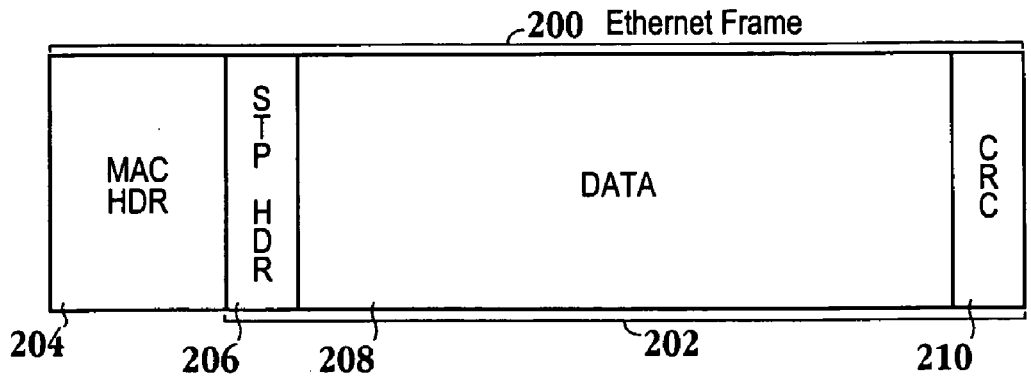
FIG. 2A shows a block diagram of an Ethernet frame that encapsulates data being transferred using a lightweight transport protocol of the ESP, in accordance with one embodiment of the present invention.

FIG. 2A shows a block diagram of an Ethernet frame 200 that encapsulates data being transferred using a lightweight transport protocol of ESP, in accordance with one embodiment of the present invention. Encapsulation of data 208 includes the use of a simple transport protocol (STP) header 206. The Ethernet frame 200 as is well known, generally includes a media access controller (MAC) header 204 and a cyclic redundancy check (CRC) portion 210. The MAC header 204 generally includes a source address (SA) and a destination address (DA), among other items defined in the 802.3 Ethernet standard. Today, the IEEE has various Ethernet working groups that are responsible for standardizing the development of new Ethernet protocols and products under an internationally well known LAN standard called the "IEEE 802.3 standard." All Ethernet standards are incorporated herein by reference.

In a preferred embodiment of the present invention, the data 208 is storage data which is communicated over a network to and from storage peripheral devices (e.g., hard drives, RAID storage arrays, etc.). The storage data can be communicated using a SCSI protocol, an IDE protocol, or any other protocol. Thus, in the Ethernet frame 200, the data 208 actually represents data that has already been pre-processed (e.g., serialized) for communication using a particular data transfer protocol. The data is then encapsulated using a storage encapsulation protocol (SEP), which will be part of the data 208 shown in FIG. 2A. The SEP will be described in greater detail below. An STP header 206 is configured to enable efficient transport of data over a network without the traditional overhead needed by the TCP protocol.

Figure 2B:
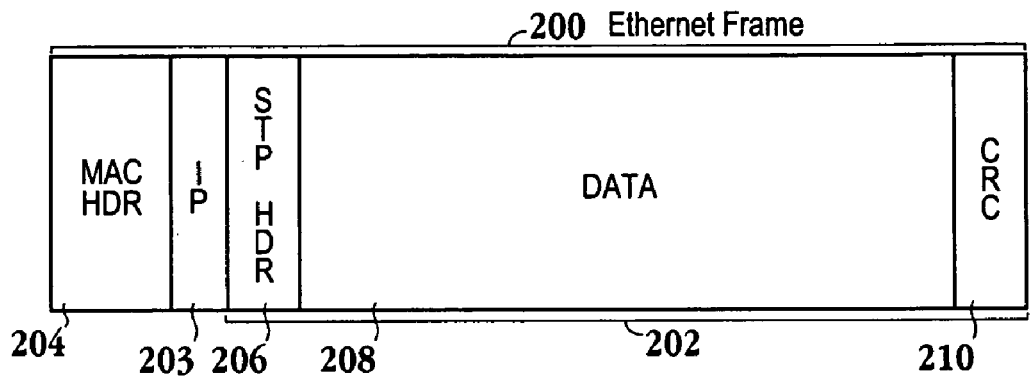
FIG. 2B shows another embodiment of data encapsulated for transport over an ESP enabled network, in which IP encapsulates STP.
Figure 2C:
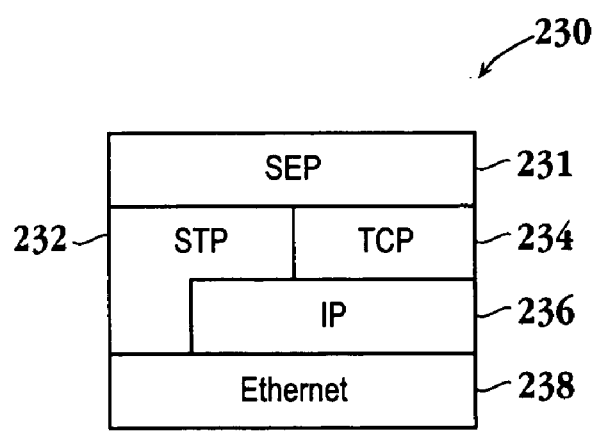
FIG. 2C is a block diagram illustrating how STP is able to run over both IP or Ethernet alone, in accordance with one embodiment of the present invention.

FIG. 2B shows another embodiment of data encapsulated for transport over an ESP enabled network. In this example, an IP header 203 is provided between the MAC header 204 and the STP header 206. As mentioned above, the use of the IP header 203 enables the transport of serial Ethernet frames 200 over a network having level 3 switches and routers, and over the Internet. As shown in the diagram 230 of FIG. 2C, SEP 231 is configured to run over STP 232, and STP 232 is able to run over both IP 236 and Ethernet 238. TCP, other the other hand, is only able to run over IP. Therefore, ESP enabled networks can easily operate locally using only SEP and STP, without the need for IP. However, when communication over a larger network or over the Internet is desired, STP can run over IP.

Figure 3A:
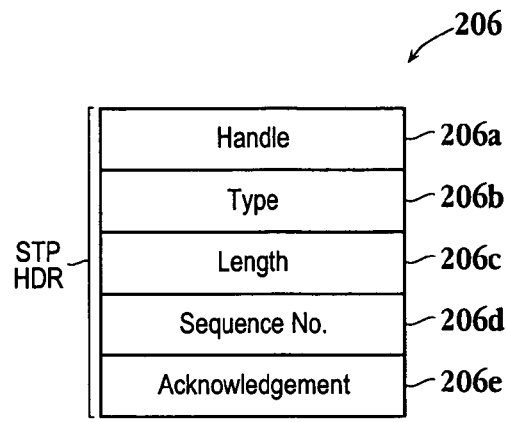
FIG. 3A shows a block diagram of the elements that define an STP header, in accordance with one embodiment of the present invention.

FIG. 3A shows a block diagram of the elements that define an STP header 206, in accordance with one embodiment of the present invention. The STP header 206 will preferably include a handle field 206a, a type field 206b, a length field 206c, a sequence number field 206d, and an acknowledgment field 206e. In one preferred embodiment, the handle field 206a will be defined by a 16-bit number which identifies the endpoint on the destination target or sender (i.e., initiator). Handles are exchanged during a session open, with each end of the transaction supplying a handle for the other end to use for communicating subsequent STP packets 202 during the session. Even if no packets are being exchanged at a particular time during the session, that session will remain open. This is different than Fibre Channel, which is required to open and close a session each time an exchange occurs.

In another embodiment, the handle field can be increased to a 32-bit field and thus enable some of the bits to be used to identify old sessions that got out of order when using STP through routers. The type field 206b is used to identify the type of packets being supported, such as stream data, datagram, control, and diagnostic. When SCSI data is being transferred, parallel SCSI data is serialized into SEP segments and will be encapsulated with a particular stream data subtype. The control and diagnostic packets will have additional information in the data segment following the header. The length field 206c defines the length in bytes of the information following a packet. The total length of the STP packet 202, which includes the STP header 206 and data 208, should always be less than the largest supported Ethernet packet (e.g., 1500 bytes or 9000 bytes). The sequence number field 206d is preferably a 16-bit field containing the sequence number of the current data packet if it is a stream STP type. In yet another embodiment, the sequence number field can be increased to 32 bits to identify "ghost" packets generated by IP routing behavior. If the packet is a control type, the sequence number is the number of the last sent stream data packet. For other types, the sequence number is preferably zero. Finally, the acknowledgment field 206e is used to identify the sequence number of the last successfully received data packet.

It should be noted that the prior art TCP/IP combination require substantially more overhead bytes to be implemented than STP or STP/IP. This is primarily because TCP/IP was designed for global networking. Thus, TCP/IP has to deal with global addressing and many types of errors which don't occur in a LAN. In addition, TCP/IP duplicates the addressing provided by the Ethernet MAC. In contrast, the ESP system of the present invention, when designed for SCSI storage transfers, can be implemented with only 12 bytes.

Figure 3B:
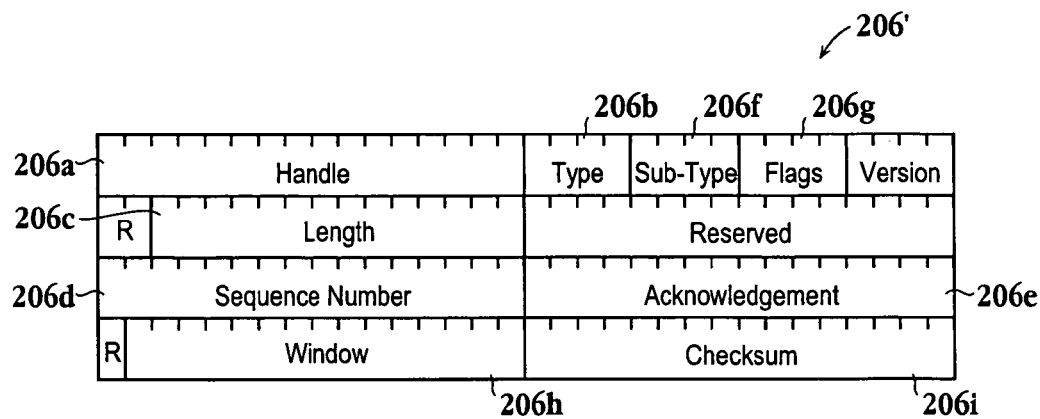
FIG. 3B illustrates a block diagram of another embodiment in which the elements of an STP header are defined.

FIG. 3B shows a block diagram of an STP header 206', in accordance with an alternative embodiment of the present invention. The STP header 206' may include more fields to provide additional functionality for current embodiments of the ESP and flexibility to future ESP embodiments. By way of example, the STP header 206' will also support a sub-type field 206f, a flag field 206g, a window field 206h, and a checksum field 206i. The window field 206h is preferably used in flow control schemes to enable the determination of how much data can be sent when a buffer becomes full. In other words, the window field can define the total number of additional frames (beyond the last successfully received frame indicated in the acknowledgment field) which the transmitting end is allowed to send. Thus, the transmitter is allowed to send frames with sequence numbers up to and including acknowledgment plus a window. The checksum field 206i will provide a 2-byte checksum covering the header, the source and destination MAC addresses, and optionally covering the data payload. However, in a preferred embodiment, the checksum field 206i will preferably not be implemented since the CRC portion 210 of the Ethernet pack frame 200 of FIG. 2 will accomplish any necessary error correction for transmission in the ESP.

Figure 4E:
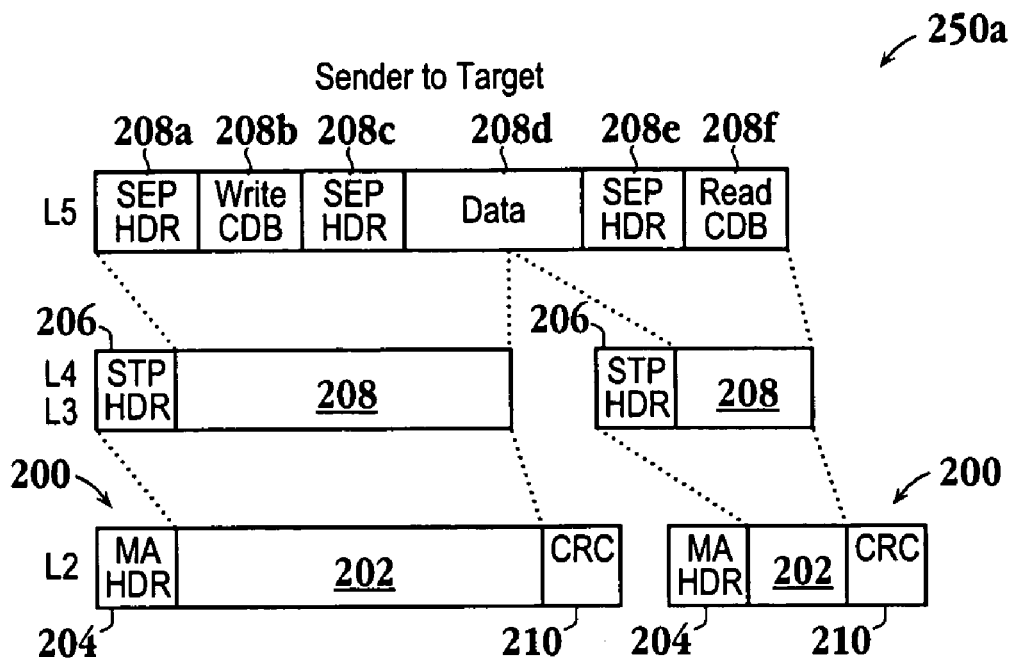
FIGS. 4E and 4F illustrate the encapsulation technique implemented in accordance with one embodiment of the present invention in order to implement the Ethernet storage protocol (ESP).

FIGS. 4A through 4G describe preferred embodiments of the present invention in which SCSI data is transferred using the Ethernet storage protocol (ESP), in accordance with one embodiment of the present invention. FIG. 4A illustrates a typical pair of SCSI transactions. First, a write command is sent along with its associated data from the sender to the target. The target then disconnects while it performs the write operation. Next, a read command is sent, which is queued up by the target. Later, the write finishes and the target reconnects to send a status byte to the sender. Finally, the read completes and the target reconnects to send the read data and status. FIG. 4A also illustrates a shaded portion that defines which SCSI phase is in effect, and a clear portion which shows what actual information is being transferred.

In parallel SCSI, a group of 5 wires defines the particular phase, while the data is carried on either 8 or 16 additional wires. Serial protocols must send all this information down the single wire, and generally try to send phase information only once per phase, rather than with every byte as parallel SCSI. Serial protocols also usually have their own contention and selection mechanisms, and use those instead of arbitration and selection phases defined by parallel SCSI. With this taken into account, frequently occurring items, such as tag messages, may be combined with other encapsulated phases to improve efficiency for the common case.

FIG. 4B defines a table that illustrates the SCSI phase definitions as well as the information transferred definitions used in FIG. 4A. FIG. 4C illustrates an encapsulation technique for parallel SCSI phases for use on serial protocols. An SEP header is added to each segment of information to identify the type of information (i.e., which phase it comes from), that the segment carries. In other embodiments, for commonly occurring information pairs such as command plus write data and read data plus status, a single header can be shared by defining a special paired type. Because tag commands are typically used, requiring a tag message phase with each command, status, or data phase, the tag is combined with the header. By using a separate session for LUN (for those devices which have multiple LUNs), the LUN and SCSI ID information is implicit in the choice of session over which the encapsulated SCSI is sent.

Referring again to FIG. 4C, the SCSI commands and write data are encapsulated as a serial stream of bytes heading through a pipe formed by the transport layer from the sender to the target. The first STP header indicates that a command descriptor block (CDB) is following, and includes the tag for the CDB. The second header indicates that data is following, and since the data is associated with the write command, it includes another copy of the tag. Finally, the third header shows that another command follows, and contains the tag for that command. This stream of bytes is preferably transported by the ESP in a manner that preserve the order and content.

FIG. 4D shows how the SCSI status and read data are encapsulated as a stream of bytes heading back to the sender from the target. The first SEP header indicates status for the write command, and includes the write commands tag in its header. As shown, the status byte is actually passed to the sender, but for the normal case of "good status," a bit in the header would be sufficient. Next comes the read data preceded by a data-type header with the read commands tag. Finally, a second header of type status with the read commands tag indicates that the read has completed. In one embodiment, the status byte may not be provided for a good status.

Figure 4F:
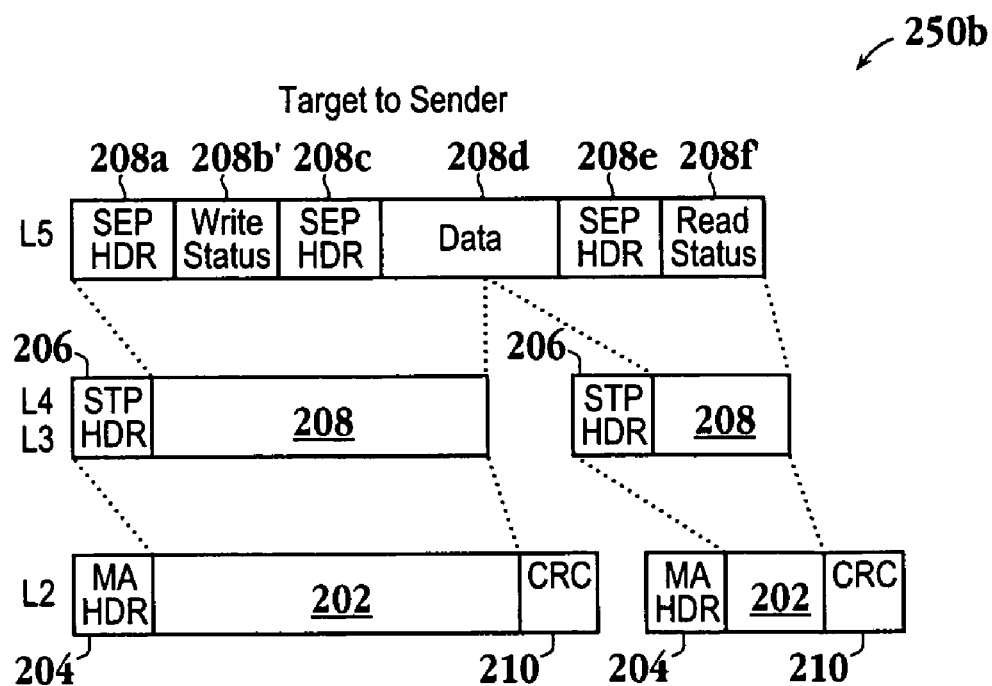

FIGS. 4E and 4F illustrate the encapsulation technique implemented in accordance with one embodiment of the present invention in order to implement the Ethernet storage protocol (ESP). In this embodiment, during a transaction 250a from a sender to a target, the first operation requires the addition of a storage encapsulation protocol (SEP) header 208a which will be followed by a write CDB 208b. Another SEP header 208c will be followed by data 208d. Finally, an SEP header 208e will follow the data 208d and itself be followed by a read CDB 208f.

In layer 4, as shown in FIG. 4E, fragmentation of the SCSI stream is performed such that an STP header 206 is added before the data 208 which is shown to include 208a, 208b, 208c, and a portion of 208d. The size of the STP header 206 including the data 208 will be defined by the payload section of a standard Ethernet frame 200. Thus, layer 3 is skipped since the fragmentation was performed in layer 4 and the method proceeds to layer 2 where the MAC header 204 is added to the STP packet 202 and then followed by a CRC portion 210. Thus, FIG. 4E shows how the ESP eliminates the functionality of layer 3. The functions of layer 3 are subsumed by layer 4 (fragmentation) and layer 2 (addressing). The removal of layer 3 helps in reducing header bytes, which simplify implementation of the ESP system. This simplification along with others of the STP enable easier implementation in hardware (or microcode).

The remaining portion of the data 208d of the SCSI stream will be added to a next STP packet which will include its own STP header 206 and a data portion 208. The data portion 208 of this remaining portion will thus include SEP header 208e, and read CDB 208f. The STP packet 202 will then be packetized as part of an Ethernet frame 200 that will itself include a MAC header 204 and a CRC portion 210. The same type of fragmentation is performed in 250b of FIG. 4F, in which a write status 208' and a read status 208f' are processed and transmitted from the target to the sender.

Figure 4G:
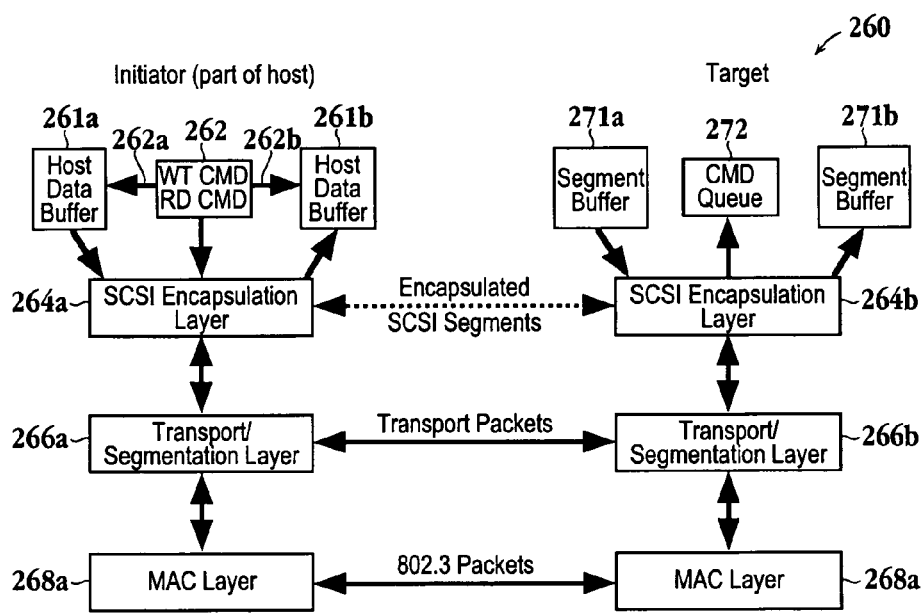
FIG. 4G illustrates a block diagram of the ESP processing in accordance with one embodiment of the present invention.

FIG. 4G illustrates a block diagram 260 of the ESP process in accordance with one embodiment of the present invention. As shown, an initiator which is part of the host (e.g., having a PIC) may want to establish a data transfer and open a session with a particular target. For instance, the host may want to send a SCSI write command (WT CMD) or a SCSI read command (RD CMD) 262 to a particular target. The WT CMD or RD CMD 262 will be passed from the host to a SCSI encapsulation layer 264, namely, 264a. The host will provide a pointer 262a to the host data buffer 261a, such that data can be transferred from the host buffer to the SCSI encapsulation layer 264a. During a read command, a pointer 262b is used to define the memory space in the host buffer 261b that is configured to receive the data read from the target. The SCSI encapsulation layer 264a can communicate with the transport/segmentation layer 266a for packet transport (e.g., STP encapsulation) and the MAC layer 268a for encapsulation of Ethernet frames (also referred to as "packets") in accordance with the 802.3 standard.

The MAC layer 268a of the host will be in communication with the MAC layer 268b of the target over a physical medium, such as a CAT 5 wire, or other networking cables. The MAC layer 268b is in communication with the transport/segmentation layer 266b and the SCSI encapsulation layer 264b of the target. The SCSI encapsulation layer 264b is shown in communication with the command queue 272 of the target and the segment buffers 271a and 271b of the target.

Figure 4H:
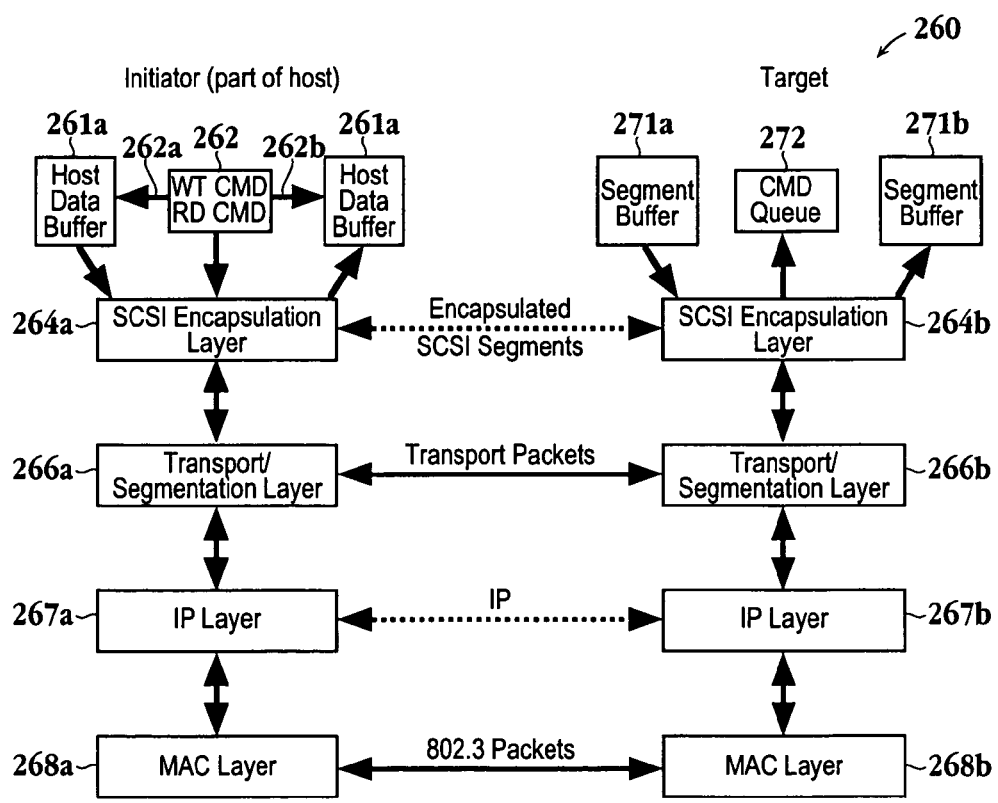
FIG. 4H illustrates a block diagram of the ESP processing in which IP implemented, in accordance with one embodiment of the present invention.

FIG. 4H illustrates a block diagram of the ESP processing in which IP is implemented, in accordance with one embodiment of the present invention. In this embodiment, an IP layer 267a is shown for the initiator side and an IP layer 267b is shown for the target side. The IP layer 267a is shown in communication with the transport/segmentation layer 266a and the MAC layer 268a. The IP layer 267b is shown in communication with the transport/segmentation layer 266b. In sum, FIG. 4H is provided to make clear that the ESP can either function with IP or without IP depending upon the desired communication arrangement and capabilities.

In a preferred embodiment, the storage encapsulation protocol (SEP) of the present invention has the following three functions: (1) identifying the command, data, status and message information segments; (2) associating commands with their data and status; and (3) providing flow control between host data buffers and target data buffers.

The first function implies appending a header with a type field to the data associated with each phase. In applying the Ethernet storage protocol (ESP), many of the messages used by parallel SCSI will not be necessary because their purposes are accomplished directly by SEP headers or other parts of the ESP. However, a message type will be included to handle the few which may remain. The second function, association of commands with data and status is necessary for devices that can queue up several commands, such as disk drives. The SCSI approach of adding a small tag to commands, data and status will be continued by the ESP implementations designed for SCSI, where the tags will be in a field of the SEP header.

SCSI disk drives are capable of queuing multiple commands, allowing them to process the commands in the most efficient order. Unfortunately, disk drives tend to have a limited amount of data buffering memory, which can be overwhelmed by the data associated with queued write commands. Parallel SCSI will disconnect when this happens and request a write command's data only when it is processing that particular write command. If write data is sent immediately after a write command and reliance is placed on the transport or link layer protocol to prevent data buffer overrun, future commands and write data may be blocked from reaching the drive (even though it might be more efficient for the drive to process them first). Accordingly, SEP is configured to provide data buffer flow control (function number 3 listed above).

The SEP header does not have to contain any target or local unit number (LUN) addressing information, because each target-LUN pair has a separate transport layer session connection. Thus, the target-LUN information is implicit in the session over which the encapsulated SCSI is being sent.

The SEP encapsulation approach is being described herein in relation to SCSI. However, as described above the SEP encapsulation can work to transmit other commands, such as ATAPI, and the like. With this in mind, SCSI identifies the type of information (phase) on the data lines with a set of encoded control lines. For a serial approach, it is much more efficient to send a type code at the beginning of the new phase, which applies until the next phase. This type code is part of the SEP header (as shown in FIGS. 3A and 3B) that is appended to the beginning of data from each phase. This SEP header also contains the SCSI tag, so that data and status segments can be matched to the correct command. The STP transport protocol is configured to provide a stream of bytes arriving in the same order as they were sent. Interpretation of those bytes is left up to the higher layer, such as SEP. Accordingly, the headers need to be identifiable by SEP using information within the data stream.

A count of bytes until the next header will be placed in the current header, and SEP will use this byte count to determine the location of the next header. The byte count method is used because it is fairly simple to implement, efficient, and completely self-contained. However, there may be cases where the transport layer is required to identify the location of an SEP header, in which case a flag in STP will be used to indicate when an SEP header is the first item in a transport packet. An ESP implementation must be able to force all SEP headers to be at the beginning of a transport packet if either initiator or target insist, and should indicate when a header happens to be at the beginning of a transport packet in any case. To make extracting a SEP header more efficient, it is preferred that it be placed on a four byte boundary.

Preferably, the SEP implementation is designed to extract headers from anywhere in the stream, and only assumes that the very first four bytes of a new STP session are an SEP header. However, it also makes no attempt to concatenate separate commands at the SEP level, or SEP segments at the STP level, so all SEP headers for CDBs will be in the first four bytes of an STP packet. In another preferred embodiment, the implementation does not preclude the concatenation of commands. It should be noted that the status segments and write data segments can come immediately after other SEP segments, without an intervening STP packet boundary.

The simple transport protocol (STP) will now be described with reference to exemplary SCSI transactions. STP provides a low overhead, LAN-oriented transport to efficiently and reliably move blocks of data to and from target devices. As described above, the host computers should have a PIC to enable communication in accordance with the ESP and the target devices should be native ESP devices. Alternatively, the target devices can be off-the-shelf devices that can gain access to the ESP network by way of a bridge circuit 131, as described with reference to FIG. 1C. Also important to note is that STP can either be used alone without IP for some small LAN environments and in other cases STP can be run over IP for larger LAN environments or communications over routers and the Internet. In a preferred embodiment, where SCSI data is being moved, STP will move SCSI data that has been serialized and encapsulated using the described SEP protocol.

All STP packets share a common header structure. STP enumerates different packet types for performing various tasks. STP is responsible for pre-pending each data frame with an STP header and then preparing the frame for the addition of an IP header and encapsulation in an IP-compatible Ethernet MAC header.

STP provides datagram and data stream services for SEP. Datagram service is limited to applying the appropriate header and sending pre-formatted data on the Ethernet. It does not packetize data or provide any guarantee of packet delivery. For data streams, STP will break up incoming data blocks into packets as shown in FIGS. 4E and 4F, such that each packet will fit into the data portion of one 802.3 (Ethernet) Frame. The destination node will be specified using the MAC Address in the 802.3 frame. Each STP packet will begin with an STP header. Sequencing of stream data is by frames, hence the sequence number, acknowledgment and window values in the STP header will refer to frames counts.

Acknowledgments are piggybacked when possible using the Acknowledgment value which will be the sequence number of the last successfully received packet. It acknowledges all previously unacknowledged sequence numbers up to the Acknowledgment field value. Negative Acknowledgments are used instead of implementing complicated time-outs and are piggybacked when possible using the Acknowledge field in the header. A Negative Acknowledgment will be indicated by setting the NAK flag in the header of a SESSION_ACK_NAK packet. A negative acknowledgment will be sent when a sequence number gap is detected in the incoming packet stream. Preferably, a NAK will only be sent once; if it is lost the protocol will recover through transmitter time-outs. The Acknowledgment field will point to the last successfully received packet before the gap, and will acknowledge all previous packets just as with a Positive Acknowledgment. Receipt of a NAK indicates to a transmitter that it should immediately re-send all packets with higher sequence numbers than the value in the Acknowledgment field. The receiving STP will throw out and not acknowledge all packets received after a sequence number gap has been detected until the missing packet has been received. The transmitting STP will re-send all unacknowledged packets, either through time-outs or the receipt of a NAK, so the receiving STP will eventually get all the packets. This is done to simplify the design of the STP receiver.

In a preferred embodiment, windowing may be used and piggybacked when possible. The window value will be added to the acknowledgment field value to indicate the largest sequence number that the receiver can fit into its buffer space. Thus, the transmitter will not send a packet with a sequence number higher than Acknowledge+Window. If there are no pending packets to piggyback with, the ACK and window will be put in a SESSION_ACK_NAK packet. The outgoing sequence number will not be increased, as SESSION_ACK_NAK packets are not themselves acknowledged. If a window of zero is received and no packets are being sent in the opposite direction, the transmitter has no way of knowing that the window size has increased at the receiver. Therefore, if a window of zero is received, and the transmitter still has packets to send, it will periodically send a SESSION_PROBE packet to query the receiver about its window status. If the receiver can accept the probe, it must return a reply indicating its window size, even if the window is unchanged and still zero.

If a transmitter times-out on a packet, it must retransmit the packet. If multiple packets are pending, then STP will transmit all packets, since the time-out period will be rather course and the failure to receive an acknowledgment probably indicates the packet was lost, which means all successive packets need to be retransmitted anyway. On the other hand, the ACK could just be late, so waiting for each transmitted packet to time-out can save some packet re-transmissions, as well as simplify the code.

It should be understood that the STP of the present invention can be configured to transfer any type of data. However, the STP, as mentioned above finds most benefit in local area networks in which high bandwidth storage transfers are required. For the storage environment, one embodiment is to utilize the SCSI protocol. To implement the SCSI protocol, SCSI messaging must be efficiently handled by STP.

The parallel SCSI message system is very powerful, but very inefficient when used on a serial interconnect. Therefore, the most common messages are preferably incorporated into the SCSI encapsulation layer (or STP v2 header) as type codes and flags, while less common ones are sent across in their own packet. Finally, some messages aren't really applicable in a system using the STP, because the functions they provide are already built in to the protocol.

The first group are those that are implicitly passed along as part of the SCSI encapsulation. In a LUN bridge they would be used on the SCSI bus portion, but would be extracted from, or inserted into the STP headers. This first group is provided below in sections (i)–(iv).

(i) Command Complete—If SCSI linked commands are used, it is possible for a status phase to occur without a following Command Complete message. However, since linked commands are never used, and not even supported by many host adapters, Status and Command Complete always come as a pair. SEP will define a Command Complete flag that can be used with a data segment or a status segment. When used with Status packets, it will indicate that a Command Complete message followed the Status (good or bad). Thus, if a linked command is encountered, they can still be supported.

(ii) Disconnect—Ethernet is inherently a multiplexed interconnect, and the SEP layer contains built in flow control. Hence the Disconnect message is not needed in the implementation of the ESP.

(iii) Identify—LUN information is implicit in STP Session Handle, so explicit Identify is not required.

(iv) Queue Tag—A tag is built into all the SCSI packet headers. For SCSI Data and Status packets this is sufficient. For SCSI Command packets, an indication of how the command should be placed into the queue is required. This is accomplished by having separate Command packet types for Head of Queue Tag, Ordered Queue Tag and Simple Queue Tag. If a device does not support tag queuing, then simple queue tag commands will be used.

The second group includes messages whose functions will need to be embedded in SEP. These involve manipulating initiator data pointers. The third group includes messages that may just be passed along to or from the host adapter. By passing these along, adapting target devices to be ESP enabled by way of a TPI is simplified since their SCSI oriented firmware can be used without modification. The fourth and final group are those commands which are meaningless to SCSI using the ESP, and hence will not be passed through or have equivalent information built into the STP header.

Transport level protocols must provide a mechanism for detecting lost (and sometimes out-of-order) packets. This is typically done by sequentially numbering each packet, using a Sequence Number. Currently, TCP numbers each byte rather than each packet. The rationale for this is that TCP concerns itself with safe delivery of a stream of bytes, and, at least conceptually, is unaware of the fragments which the physical medium breaks that stream into (which is the IP's job). Thus, TCP picks the packet size it uses based on the need to reliably transmit its data, and can change the size as it goes. Also, since TCP expects out of order packets along with the varying packet sizes, using a packet count would prevent re-assembly of partially received data. Therefore, the only way to safely reconstruct the data stream at the receiving end is to sequence the data by byte count, rather than packet count. A disadvantage with TCP is that byte sequencing requires a larger sequence number field than packet based counts. It also entails more complicated book keeping than a packet sequencing, especially if the packets are more closely tied to the MAC layer packet size. The ESP of the present invention avoids many of these problems by using sequence numbers that are associated with individual packets.

A two-way handshake that includes handles is used to exchange information and to begin a session (also referred to as session initialization). The handshake consists of an initiator sending an Establish Session packet to a target previously made known to it through a device discovery process. The Establish Session packet will include a handle for the target to use when sending packets back to the Initiator (e.g., sender), the MAC address of the Initiator, and the LUN for which this session is being opened. The Target will reply with an Establish Session Acknowledge packet that will include the Handle for the Initiator to use when sending future packets to the Target. At this point the session is established. As shown in FIG. 1E, sessions 144 were established.

Figure 5A:
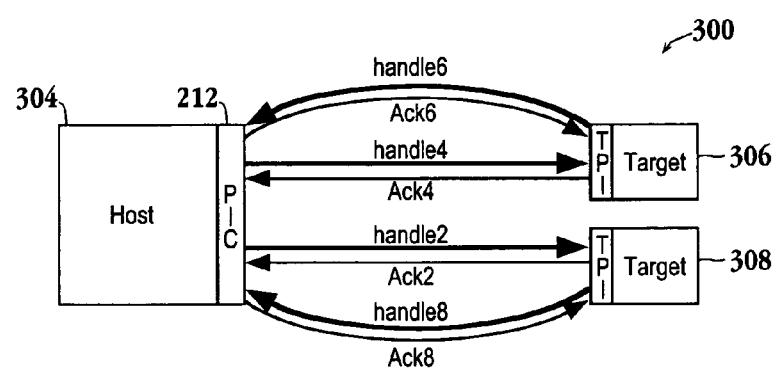
FIG. 5A is a diagram illustrating two exemplary ESP transactions (e.g., to open sessions) with targets, in accordance with one embodiment of the present invention.
Figure 5B:
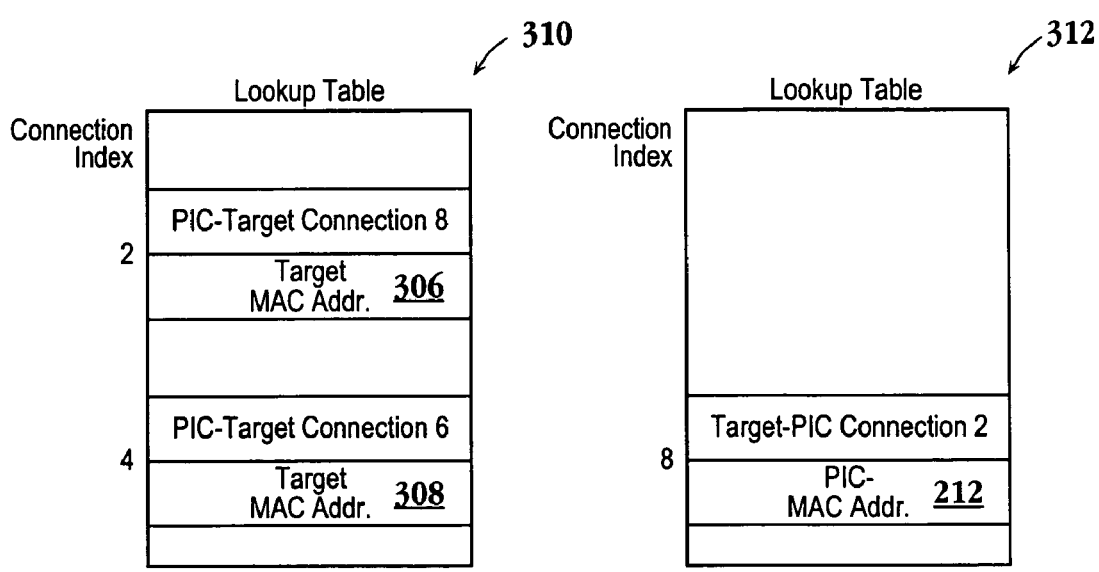

For ease of describing the interaction between a host and a target, FIG. 5A provides a diagram illustrating two exemplary interactions with targets, in accordance with one embodiment of the present invention. A handshake begins when the host 304 by way of the PCI 212 sends a handle 4 to the target 306 and a handle 2 to the target 308. The host will maintain a lookup table 310 listing each session it has open with a particular target. In this case, lookup table 310 of FIGS. 5B-1 shows that the host 304 has two connections (i.e., sessions) open, each corresponding to the handles 2 and 4, shown by the connection index. Each of the targets will also send a handle to the host 304 so that host can use that handle for future communications. As shown, the targets 306 and 308, each of which has an associated target peripheral interface (TPI), can communicate a handle 6 and a handle 8, respectively. In a preferred embodiment, the lookup table is indexed by the local end's handle number, and caches the MAC address (i.e., of Target 306) and handle number of the remote end (i.e., TPI-Target Connection 8). As an example, look up table 310 shows the handle of the other end as being TPI-Target Connection 8 and the MAC address for Target 306 of the connection associated with local handle 2 of host 304, and look up table 310 also shows the handle of the another end as being TPI-Target Connection 6 and the address as Target 308 for the connection associated with local handle 4 of host 304.

Figure 3:
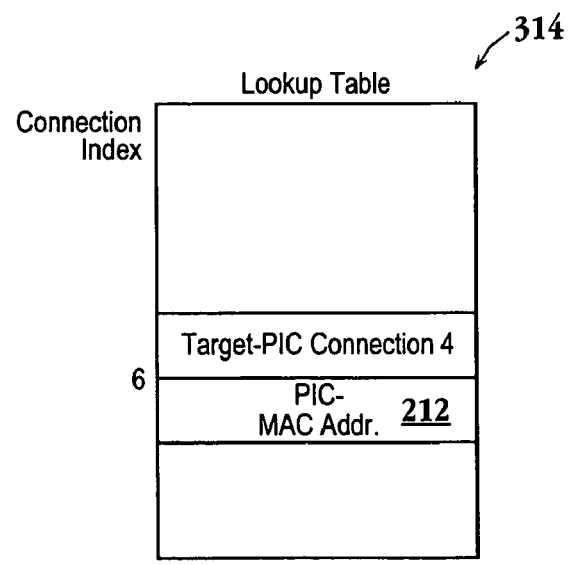

Of course, the target drives need not have the TPI if a bridge circuit 131 is used. Each target will maintain its own lookup table for each associated connection in a similar manner as described above with respect to the host. As shown, target 306 will have a connection 6 indexed and target 308 will have a connection 8 indexed in their respective lookup tables 314 of FIGS. 5B-3 and 312 of FIGS. 5B-2.

In accordance with this example, a session can also be terminated. With disk storage, most sessions will last until the system is shut down, or the storage device is unplugged. Other types of storage devices may want transient sessions, which are only created when an initiator has a need to send or receive data from the device. So session termination really means discovering that a target has disappeared from the network and cleaning up the initiator's session and target lookup tables. However, for those rare cases where a shutdown happens, a session termination protocol will be defined.

In one embodiment a need will be presented for detecting whether a target device has been disconnected or otherwise disabled. An approach may be to wait until an initiator tries to send it a new command. Eventually the initiator will give up and declare the device dead. This information can then be propagated to other initiators. Another approach may be for the master initiator to occasionally poll all targets to make sure they are still alive. Furthermore, if an initiator disappeared, the master could assume that some initiators might be down as well, and initiate more aggressive polling. In any event, targets discovered to be down could be reported to other initiators through an initiator exchange mechanism.

Figure 6:
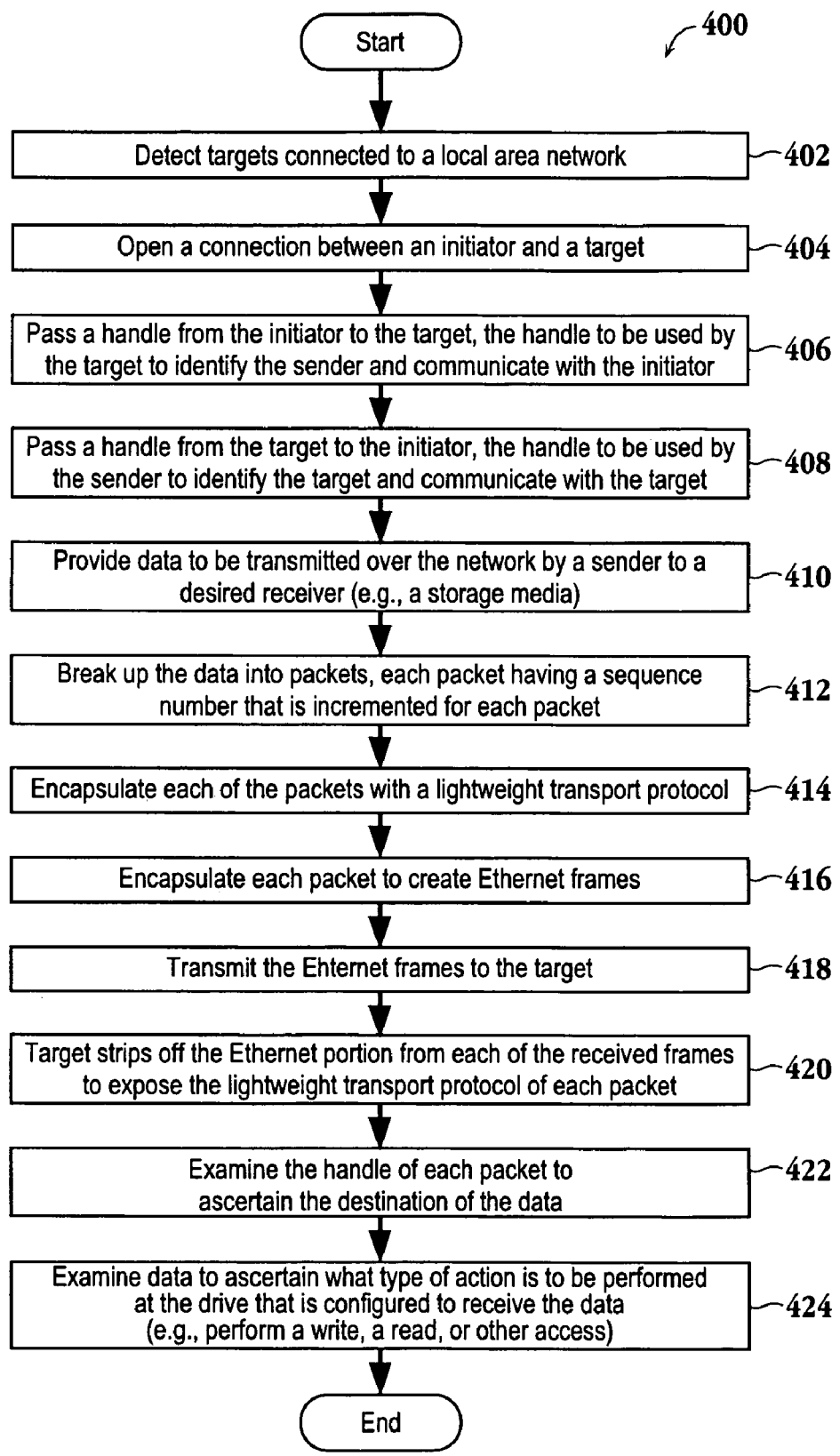
FIG. 6 illustrates a flowchart diagram of the present invention, which describes an exemplary transaction between an initiator and a target using the Ethernet storage protocol (ESP).

FIG. 6 illustrates a flowchart diagram of the present invention, which describes an exemplary transaction using the Ethernet storage protocol (ESP). It should be understood that the ESP of the present invention will enable more efficient transfers of data over a communication link, such as a local area network (LAN) or wide area network using IP. In one embodiment, the transfer of data will preferably be storage data which needs to be communicated over a high speed network connection. The connection speeds, in one embodiment, are those defined by the Ethernet standard, such as 10 Base T, 100 Base T, Gigabit Ethernet, 10 Gigabit Ethernet, and the like. The commands and data format can be defined by any protocol, such as SCSI, ATAPI, and the like.

For exemplary purposes, this discussion is facilitated by reference to SCSI. Therefore, SCSI commands and data are encapsulated in accordance with the STP and then encapsulated into an Ethernet frame for fast efficient communication over the network to a desired target. The target, therefore, is preferably a storage target, such as a hard disk drive, a RAID array, a storage box, or other peripheral device that can store and exchange data. With this in mind, the following represents only one exemplary transaction of the present invention.

The flowchart 400 begins at an operation 402 where the ESP is configured to detect targets connected to a local area network (LAN). Once the targets are detected, a connection is opened between an initiator and a target in operation 404. The initiator, as described above, is preferably a host computer (e.g., workstation, server, cluster server, etc.) that includes a peripheral interface card (PIC), or is equipped with a motherboard or suitable electronics or even software that can perform the ESP functionality of the present invention. The target device can be a native ESP target device which includes integrated electronics that performs the target peripheral interface (TPI) functionalities described above. In another embodiment, the targets can be standard off-the-shelf peripheral devices that are connected to the ESP-enabled network by way of a bridge circuit.

The method now proceeds to an operation 406 where a handle is passed from an initiator to a target. The handle is configured to be used by the target to identify the initiator and communicate with the initiator in future transactions. A handle is then passed from the target to the initiator in operation 408 for the purpose of informing the initiator of the identify the target for future communications with the target. Once the session has been opened, the method proceeds to an operation 410 where data is provided to be transmitted over the network by the initiator to the desired target (e.g., a storage drive). Data is also ready to be transmitted from the target back to the initiator. This is commonly the case when the initiator is requesting to read data from the target. Thus, data will be flowing in both directions.

At this point, the method proceeds to operation 412 where the data is broken up (e.g., fragmented) into packets, and each packet will have a sequence number that is incremented for each packet. As described above, the breaking up of the data is configured to break up parallel data into serial data, and preferably using the SEP process described with reference to FIGS. 4A through 4G. The method then moves to operation 414 where each of the packets are encapsulated with a lightweight transport protocol. As mentioned above, the lightweight transport protocol is preferably the simple transport protocol (STP). The lightweight transport protocol is preferably one that has a reduced overhead and enables efficient transmission of storage data in a network environment. Each of the packets that have been encapsulated using the lightweight transport protocol in operation 414 are then in turn, encapsulated to create Ethernet frames in operation 416. This is pictorially illustrated with reference to FIGS. 4E and 4F above.

The Ethernet frames are then transmitted from the sender to the receiver in operation 418. Depending on the direction of the data transmission, the sender can be either the initiator or the target, and the receiver can be either the target or the initiator, respectively. The receiver then strips off the Ethernet portion from each of the received frames to expose the lightweight transport protocol (e.g., STP) of each packet in operation 420. The target then examines a handle of each packet to ascertain the destination of the data in operation 422.

These operations 410–422 can be used to send commands from the initiator to the target, data in either direction, or status from target to initiator, the command is examined to ascertain what type of action is to be performed at the drive that is configured to receive or send the data. For example, the actions may be to perform a write, a read, or other access, status, or configuration operation. In this illustration, the method of performing a communication transaction between an initiator and a target is complete. However, the session between the initiator and the target will remain open so long as the network is in operating order or so long as the target is connected to the network. Accordingly, it will not be necessary to establish a session each time transactions are desired to be communicated between a particular host and a target once the handles have been exchanged in previous transactions. This substantially streamlines the communication capabilities of the ESP network.

Figure 7:
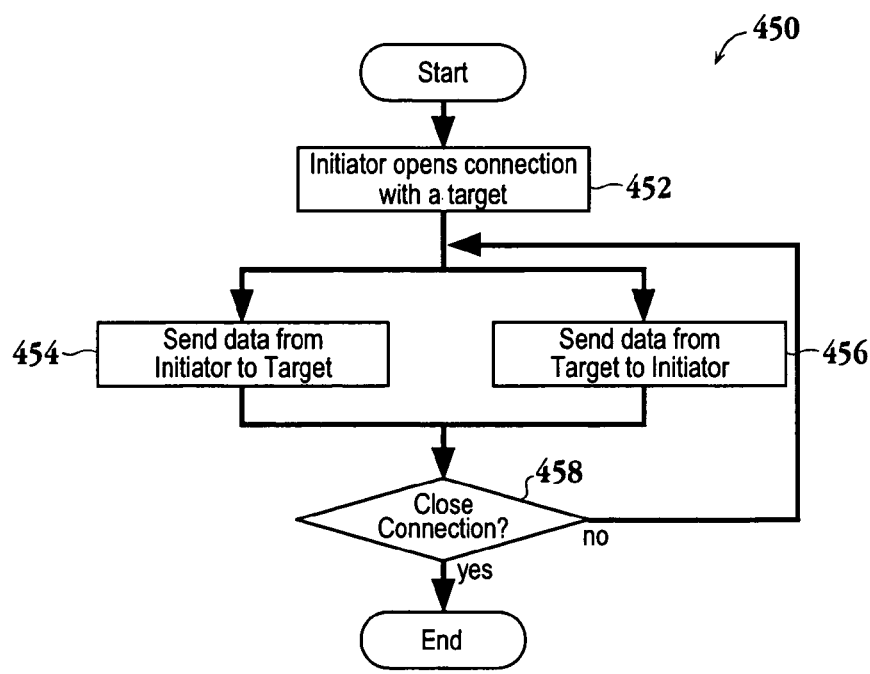
FIG. 7 illustrates an embodiment of the present invention in which ESP connections are established, maintained and closed between initiators and targets.

FIG. 7 illustrates an embodiment of the present invention in which connections are established, maintained and closed between initiators and targets. The method 450 begins at an operation 452 where an initiator opens a connection with a desired target. Once open, the method may proceed to both operations 454 and 456 where data transfers between initiators and targets and targets and initiators are executed. This connection will therefore remain open until it is determined in operation 458 that the connection should be closed. Once closed, the method will end.

It is again noted that the data being transported using the STP portion of ESP can be configured to transport any type of data, which does not necessarily have to be storage data. As mentioned above, the types of data can include storage data (which uses SEP), network data, file data, virtual interface data, etc.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

It should be appreciated that the present invention is not limited to the transport of data over Ethernet. Although the specific examples were provided with reference to Ethernet technologies, other link and physical communication protocols can also be used for communication over networks (e.g., LANs, WANs, Internet, etc.) other than Ethernet. As used herein, when communication over networks that do not use Ethernet are contemplated, the features of ESP will be referred to generically as network storage protocol (NSP). For completeness, some examples of link and physical communication protocols other than Ethernet may include FDDI, ATM, HIPPI, 100VG-Any LAN, and generically the Internet. Similar to ESP, NSP can be run over IP and over any of these link and physical communication protocols.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing storage data that is to be communicated over a network, comprising:
providing storage data to be transmitted over a network;
serializing the storage data that was provided using storage encapsulation protocol (SEP) headers to generate serialized storage data;
encapsulating the serialized storage data that was serialized using the SEP with a simple transport protocol (STP) to generate simple transport protocol data segments of the storage data;
determining whether each of the data segments is a control type data segment based on a type field value of a corresponding STP header, if the data segment is a control type data segment, then the method includes,
setting a sequence number of a sequence number field of the corresponding STP header to a sequence number of a last sent stream data packet; and
encapsulating each of the simple transport protocol data segments into Ethernet frames.

2. A method for processing storage data that is to be communicated over a network as recited in claim 1, wherein the serializing of the storage data using storage encapsulation protocol headers to generate serialized storage data includes:
receiving the storage data, the storage data including one or both of commands and data, the commands including write commands, read commands, control commands, and status commands;
selecting portions of the received storage data to be serialized, the selected portions including commands and data; and
appending storage encapsulation protocol headers to each of the selected portions.

3. A method for processing storage data that is to be communicated over a network as recited in claim 1, wherein the encapsulating of each of the simple transport protocol data segments into Ethernet packets includes:
generating media access controller (MAC) header;
appending the simple transport protocol segments to the MAC header; and
appending a cyclic redundancy check (CRC) to the simple transport protocol segments.

4. A method for processing storage data that is to be communicated over a network as recited in claim 1, wherein the corresponding STP header includes at least a handle field, a length field, and an acknowledgment field.

5. A method for processing storage data that is to be communicated over a network as recited in claim 4, wherein the handle field is used to exchange a handle during the commencement of a session, the handle being exchanged between a initiator and a target of the network.

6. A method for processing storage data that is to be communicated over a network as recited in claim 1, wherein the sequence number field is configured to count Ethernet frames.

7. A method for processing storage data that is to be communicated over a network as recited in claim 4, wherein the acknowledgment field is used to exchange positive and negative acknowledgments of transactions.

8. A method for processing storage data that is to be communicated over a network as recited in claim 1, wherein the storage encapsulation protocol contains a tag so that data segments and data segments of the storage data can be matched to a correct command.

9. A method for processing storage data that is to be communicated over a network as recited in claim 1, wherein the simple transport protocol is configured to provide a stream of bytes arriving in a same order as the stream of bytes were sent.

10. A method for processing storage data that is to be communicated over a network as recited in claim 1, further comprising:
appending an IP header to each of the simple transport protocol data segments.

11. A method for processing storage data that is to be communicated over a network as recited in claim 1, wherein the storage data is selected from one of small computer system interface (SCSI) data, AT Attachment Packet Interface (ATAPI) data, and ultra direct memory access (UDMA) data.

12. A method for communicating storage data over an Ethernet network using a non-TCP lightweight transport protocol, comprising:
providing data having a peripheral device protocol format, the data to be communicated over the Ethernet network;
selecting portions of the data having the peripheral device protocol format;
attaching storage encapsulation protocol (SEP) headers to the selected portions of the data;
attaching simple transport protocol (STP) headers to one or more of the selected portions with the SEP headers to produce STP packets;
determining whether each of the one or more selected portions is a control type data segment based on a type field value of a corresponding STP header, if the data segment is a control type data segment, then the method includes,
setting a sequence number of a sequence number field of the corresponding STP header to a sequence number of a last sent stream data packet; and
encapsulating the STP packets into Ethernet frames for communication over the Ethernet network.

13. A method for communicating storage data over an Ethernet network using a non-TCP lightweight transport protocol as recited in claim 12, wherein the peripheral device protocol format is one of a small computer system interface (SCSI) format, an AT Attachment Packet Interface (ATAPI) format, and an ultra direct memory access (UDMA) format.

14. A method for communicating storage data over an Ethernet network using a non-TCP lightweight transport protocol as recited in claim 12, wherein the STP headers include at least a handle field, a length field, and an acknowledgment field.

15. A method for communicating storage data over an Ethernet network using a non-TCP lightweight transport protocol as recited in claim 14, wherein the handle field is used to exchange a handle during the commencement of a session, the handle being exchanged between a initiator and a target of the network.

16. A method for communicating storage data over an Ethernet network using a non-TCP lightweight transport protocol as recited in claim 14, wherein the sequence number field is configured to count Ethernet frames.

17. A method for communicating storage data over an Ethernet network using a non-TCP lightweight transport protocol as recited in claim 14, wherein the acknowledgment field is used to exchange positive and negative acknowledgments of transactions.

18. A method for communicating data over a network using a non-TCP lightweight transport protocol, comprising:

providing data, the data to be communicated over the network;

selecting portions of the data that is to be communicated over the network;

attaching simple transport protocol (STP) headers to the selected portions of the data to produce STP packets;

determining whether each of the selected portions is a control type data segment based on a type field value of a corresponding STP header, if the data segment is a control type data segment, then the method includes,
  setting a sequence number of a sequence number field of the corresponding STP header to a sequence number of a last sent stream data packet; and encapsulating the STP packets into frames for communication over the network.

19. A method for communicating data over a network using a non-TCP lightweight transport protocol as recited in claim 18, wherein the data is one of storage data, network data, file data, and virtual interface data.

20. A method for communicating data over a network using a non-TCP lightweight transport protocol as recited in claim 18, wherein the network is configured to communicate storage data.

* * * * *